United States Patent
Bulters et al.

(10) Patent No.: US 7,886,612 B2
(45) Date of Patent: *Feb. 15, 2011

(54) COATED OPTICAL FIBERS

(75) Inventors: Markus J. H. Bulters, Sittard (NL); Gerrit Rekers, Born (NL); Philippe W. P. V. Bleiman, Zonhoven (BE); Jozef M. H. Linsen, Heerlen (NL); Alexander A. M. Stroeks, Valkenburg a.d. Geul (NL); Johannes A. Van Eekelen, Rozenburg (NL); Adrianus G. M. Abel, Capelle aan de Ijssel (NL); Marko Dorschu, Beek (NL); Paulus A. M. Steeman, Geleen (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/591,241

(22) Filed: Nov. 13, 2009

(65) Prior Publication Data

US 2010/0058877 A1    Mar. 11, 2010

Related U.S. Application Data

(60) Division of application No. 11/269,765, filed on Nov. 9, 2005, now Pat. No. 7,706,659, which is a continuation of application No. 09/989,703, filed on Nov. 21, 2001, now Pat. No. 7,067,564, which is a continuation-in-part of application No. 09/717,377, filed on Nov. 22, 2000, now abandoned.

(30) Foreign Application Priority Data

Nov. 22, 2000    (EP) .................................. 00204144

(51) Int. Cl.
*G01N 3/08* (2006.01)
*G01N 3/00* (2006.01)

(52) U.S. Cl. .......................................... 73/826; 73/800
(58) Field of Classification Search .................. 73/800, 73/826
See application file for complete search history.

(56) References Cited

U.S. PATENT DOCUMENTS 5,104,433 A    4/1992    Chapin et al.

(Continued)

FOREIGN PATENT DOCUMENTS

JP    01-133011    5/1989

(Continued)

OTHER PUBLICATIONS

Prosposal of the R-1102 coating compositions, which was commercially available before Nov. 22, 2000.

(Continued)

*Primary Examiner*—Sanza L McClendon
(74) *Attorney, Agent, or Firm*—Nixon & Vanderhye P.C.

(57) ABSTRACT

The invention relates to coated optical fibers comprising soft primary coatings and to such primary coatings for protecting glass optical fibers having a sufficient high resistance against cavitation. In particular, the primary coatings have a cavitation strength at which a tenth cavitation appears ($\sigma^{10}_{cav}$) of at least about 1.0 MPa as measured at a deformation rate of 0.20% min$^{-1}$ and of at least about 1.4 times their storage modulus at 23° C. The coating preferably shows strain hardening in a relative Mooney plot, preferably has a strain energy release rate Go of about 20 J/m$^2$ or more, and preferably has a low volumetric thermal expansion coefficient. The invention furthermore provides a method and apparatus for measuring the cavitation strength of a primary coating.

4 Claims, 9 Drawing Sheets apparatus used for determining the cavitation strength of a sample.

U.S. PATENT DOCUMENTS

| | | | |
|---|---|---|---|
| 5,744,514 A | 4/1998 | Shustack | |
| 5,837,750 A | 11/1998 | Szum et al. | |
| 6,107,361 A | 8/2000 | Tortorello et al. | |
| 6,110,593 A | 8/2000 | Szum et al. | |
| 6,215,934 B1 | 4/2001 | Aloisio et al. | |
| 7,067,564 B2 * | 6/2006 | Bulters et al. | 522/96 |
| 7,706,659 B2 * | 4/2010 | Bulters et al. | 385/142 |

FOREIGN PATENT DOCUMENTS

| | | |
|---|---|---|
| JP | 06/128525 | 5/1994 |
| JP | 10-300996 | 11/1998 |
| JP | 11/501897 | 2/1999 |
| JP | 11-116642 | 4/1999 |
| JP | 2000-111767 | 4/2000 |
| JP | 00/309615 | 11/2000 |
| JP | 02/060444 | 2/2002 |
| WO | 97/42130 | 11/1997 |
| WO | 98/21157 | 5/1998 |
| WO | 98/41484 | 9/1998 |
| WO | 98/56846 | 12/1998 |
| WO | 99/08975 | 2/1999 |
| WO | 99/15473 | 4/1999 |
| WO | 99/48939 | 9/1999 |
| WO | 99/52958 | 10/1999 |
| WO | 97/42130 | 11/1999 |
| WO | 99/59930 | 11/1999 |
| WO | 00/14024 | 3/2000 |
| WO | 00/18696 | 4/2000 |
| WO | 2000-509699 | 8/2000 |
| WO | 2000-510515 | 8/2000 |

OTHER PUBLICATIONS

India First Examination Report dated Jun. 1, 2006.

Proposal of the R-1102 coating composition, which was commercially available before Nov. 22, 2000.

* cited by examiner

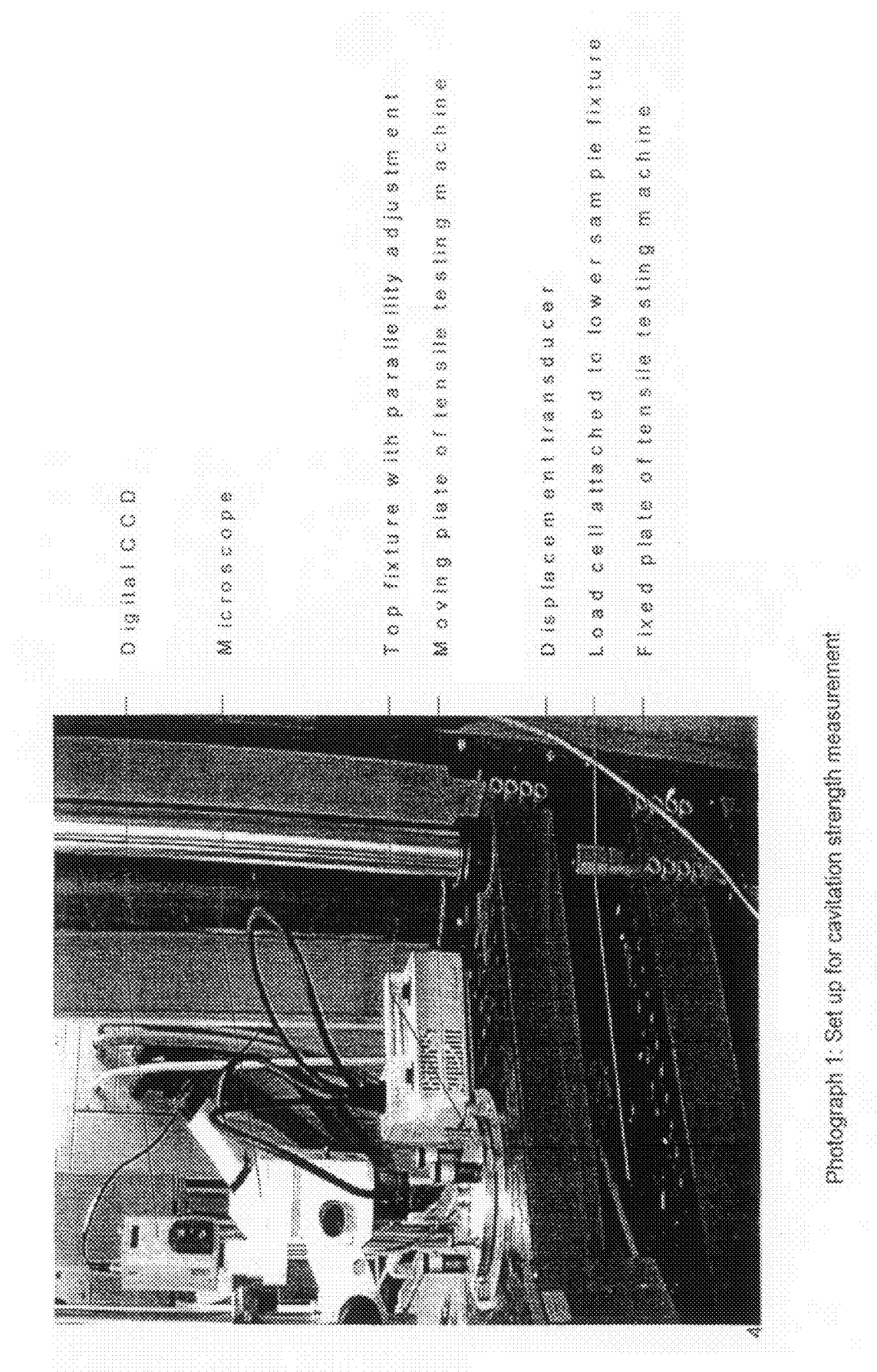
Photograph 1: Set up for cavitation strength measurement

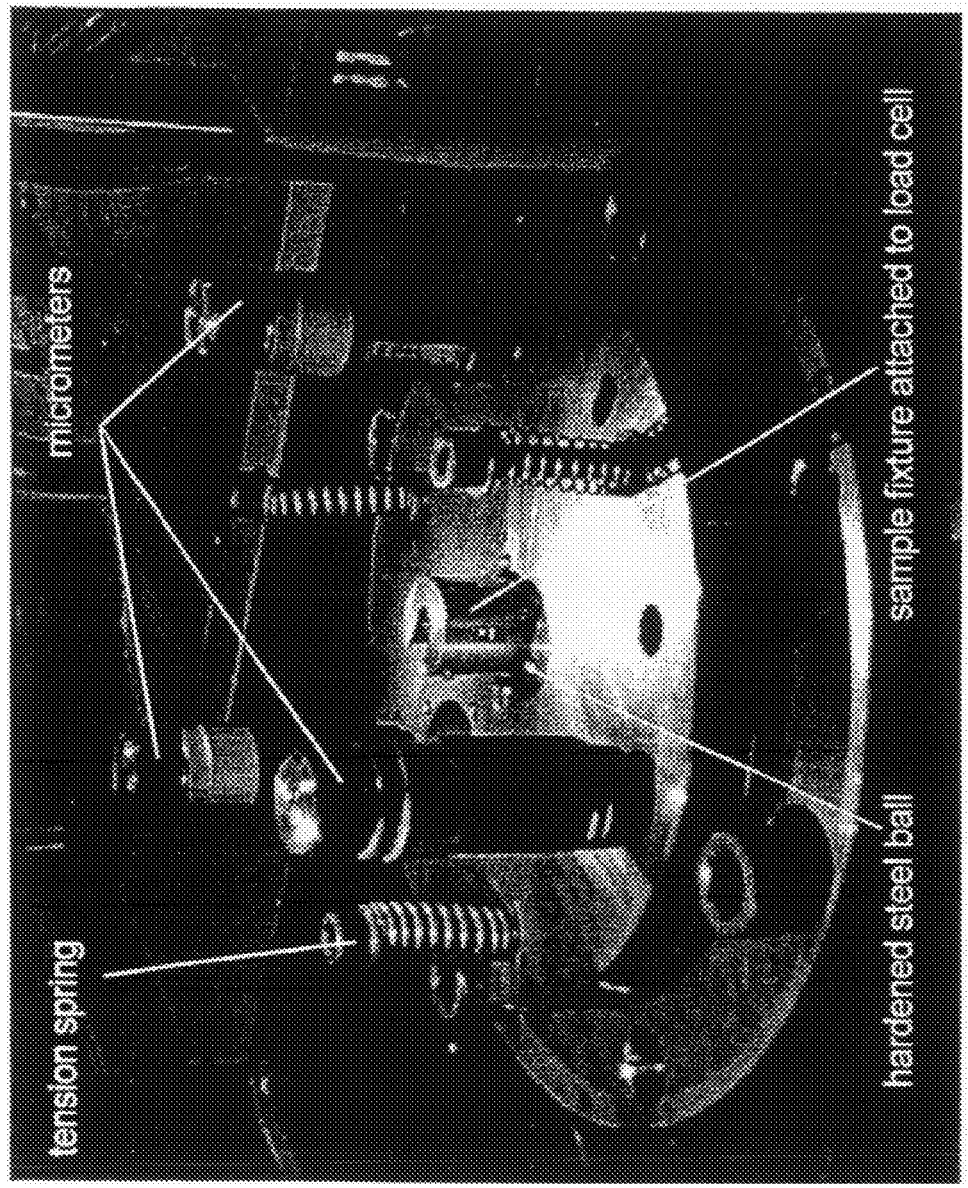

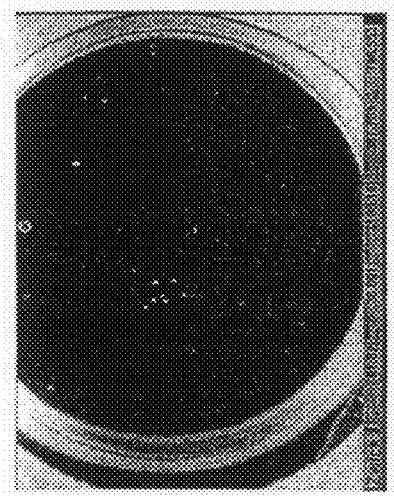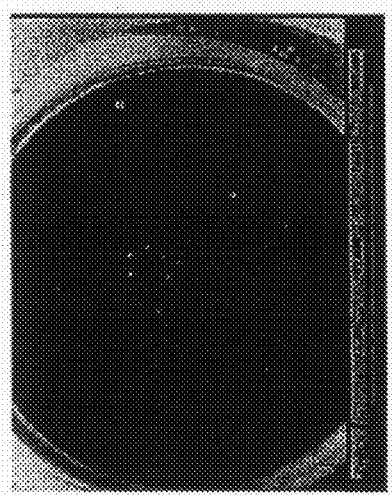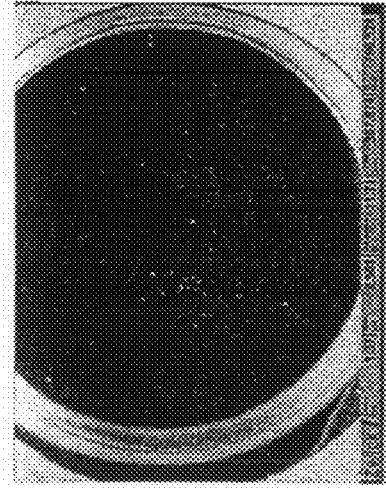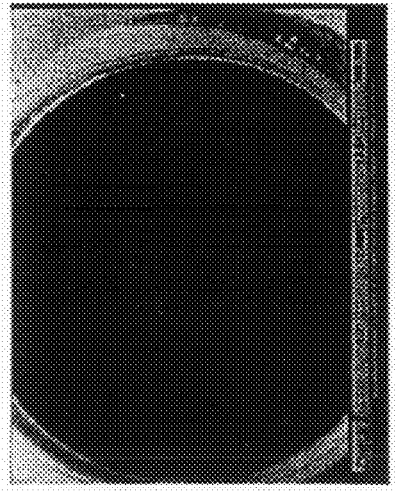
Photograph 3: samples of two primary coatings A and B with cavities; appearance of cavities as a function of the applied force

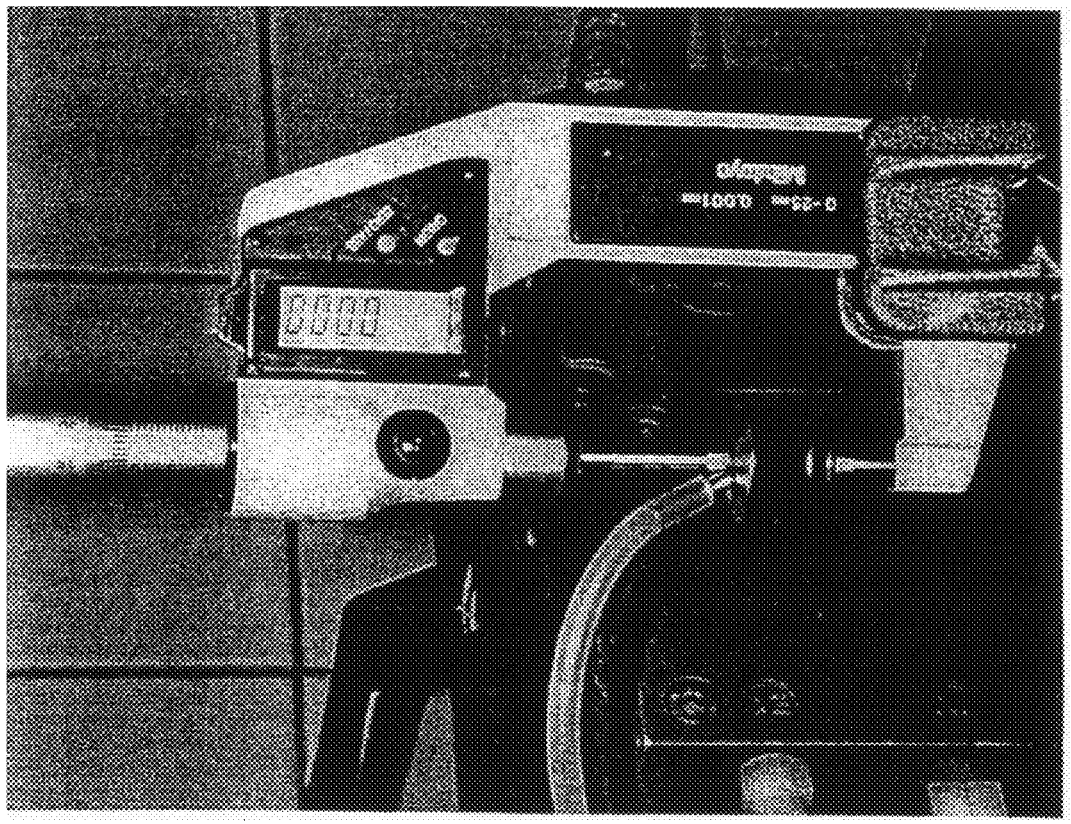
Photograph 4: Micrometer set-up in sample preparation for cavitation strength measurement

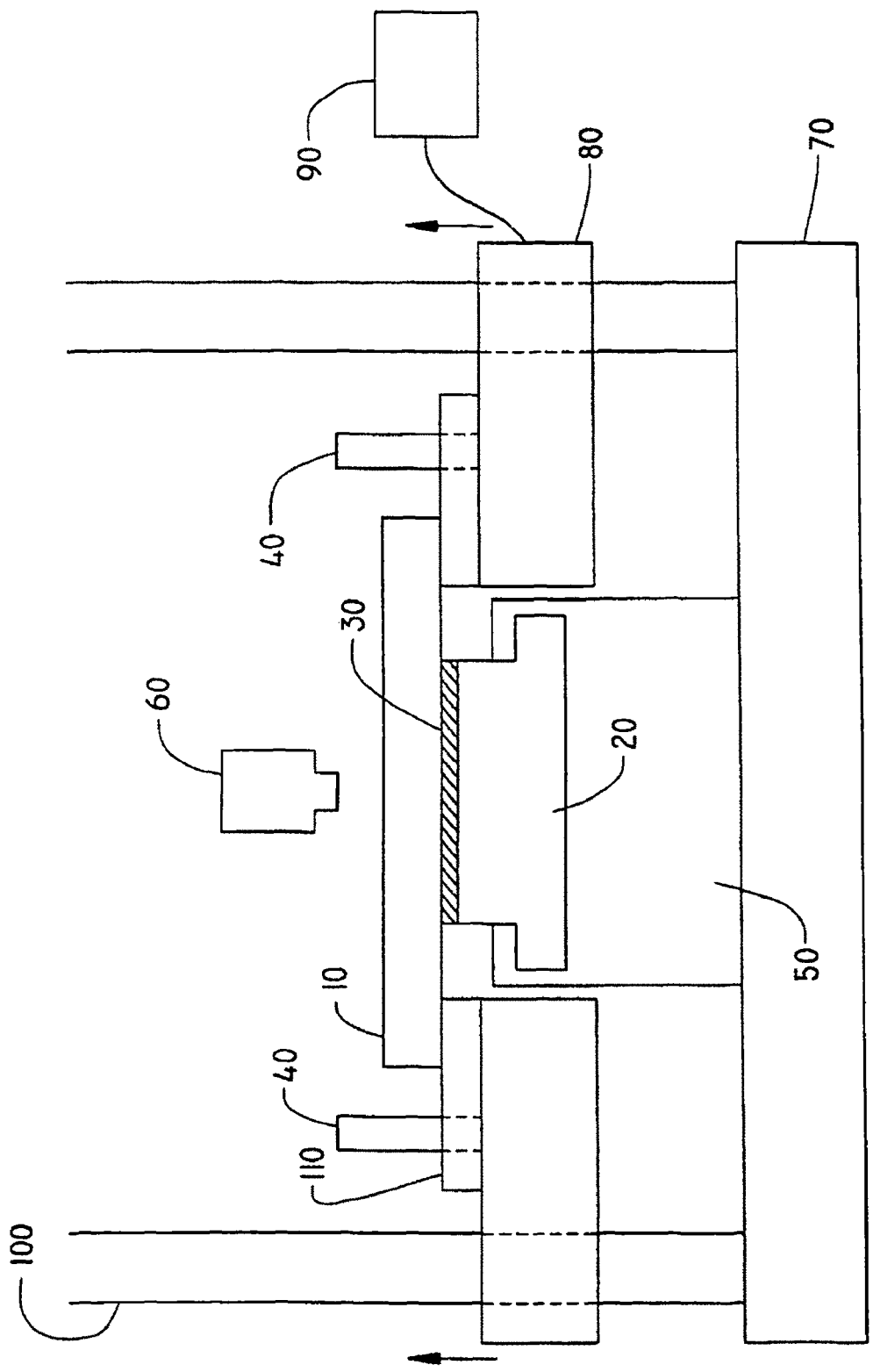
Figure 1: apparatus used for determining the cavitation strength of a sample.

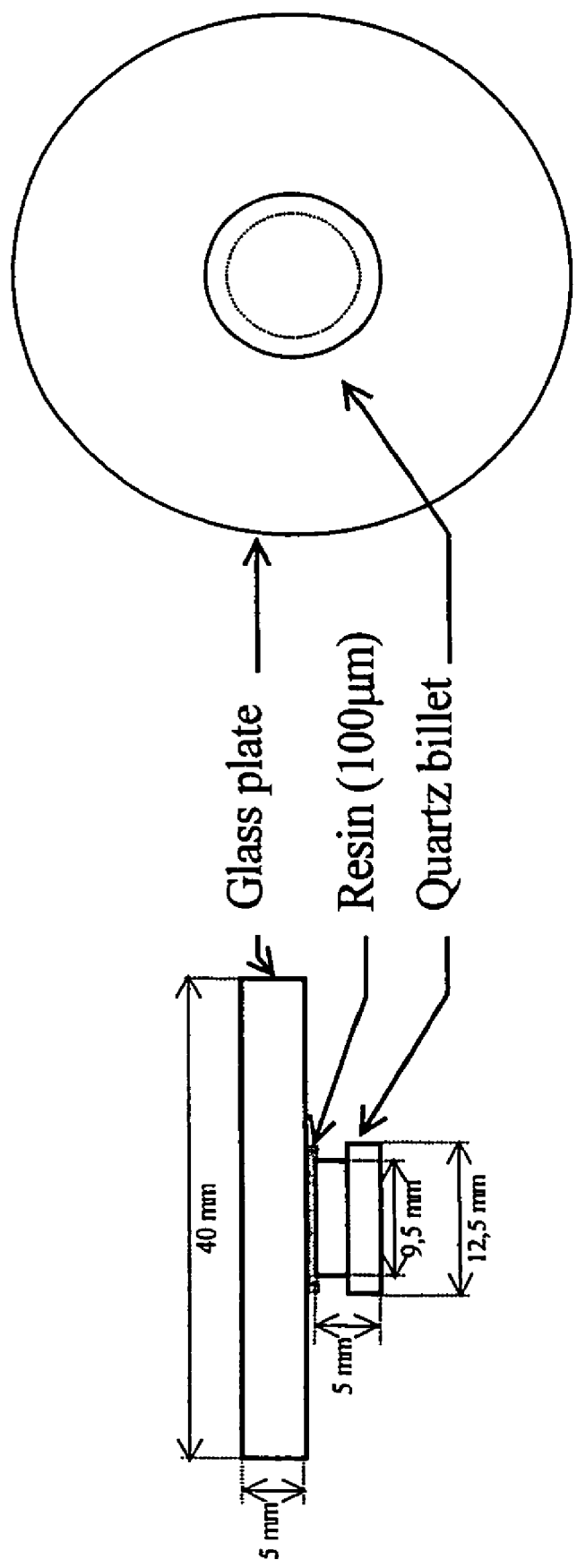
Figure 2: Sample geometry.

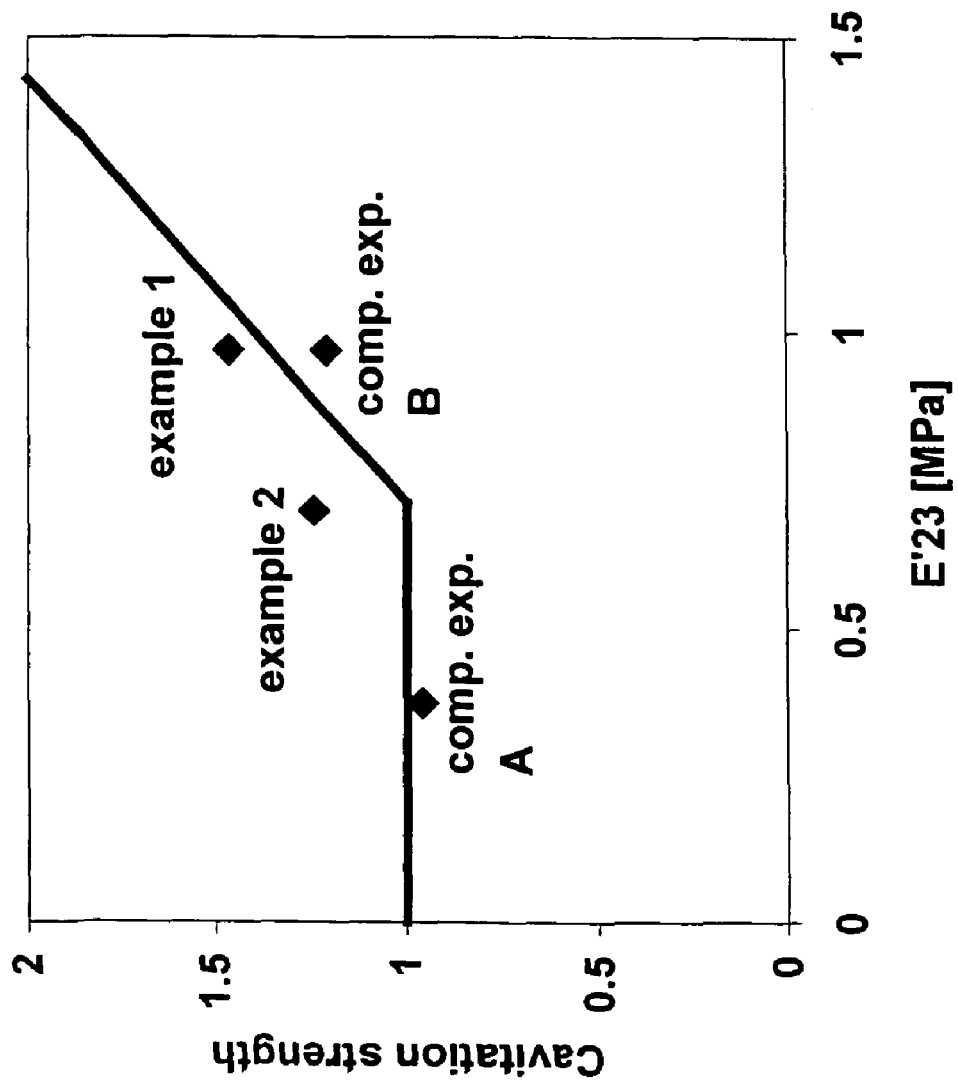
Figure 3: Cavitation strength at the tenth cavitation $\sigma^{10}_{cav}$ as a function of $E'_{23}$

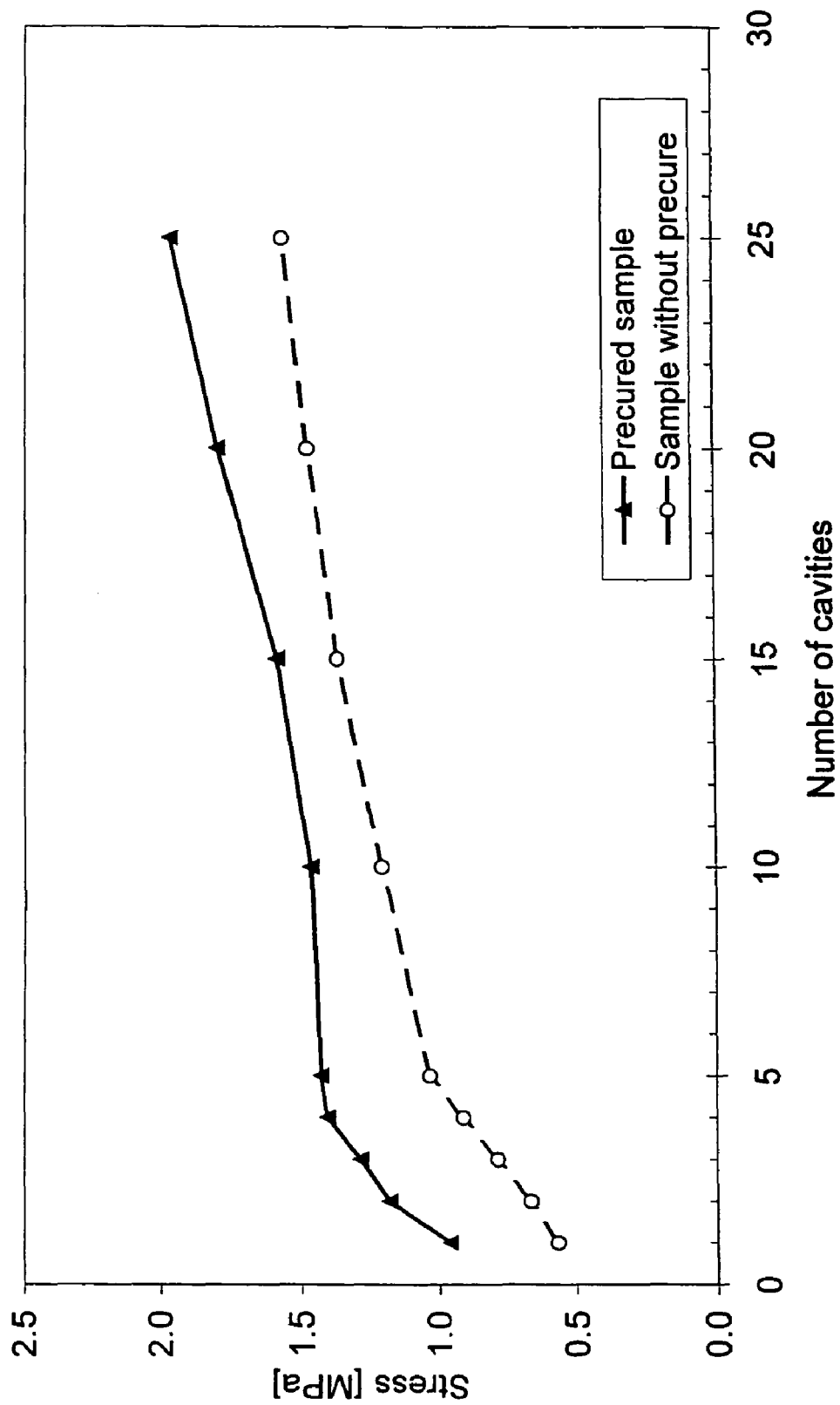
Figure 4: Cavitation strengths of a primary coating sample with and without precure

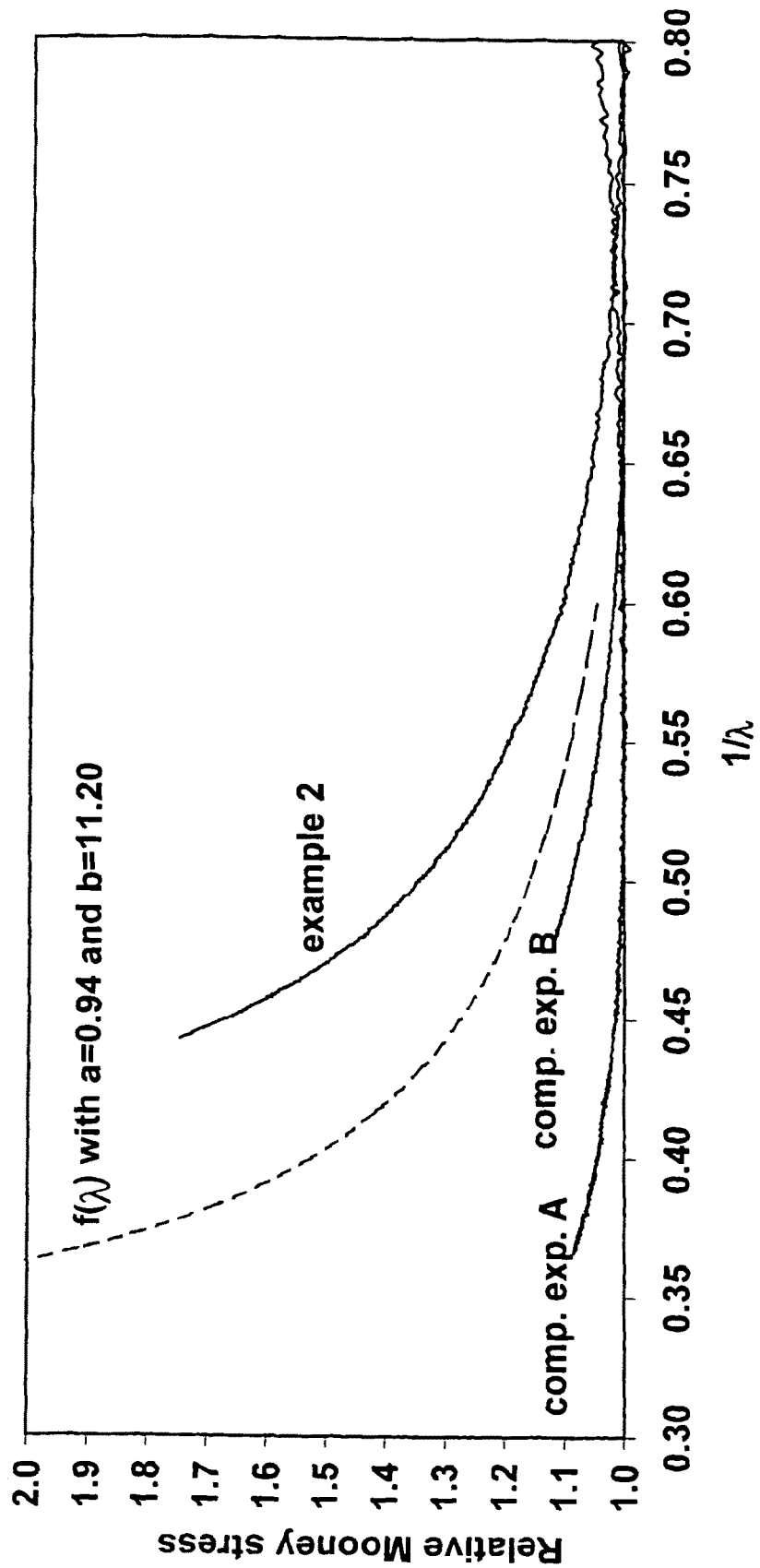
Figure 5: Relative Mooney plots of primary coatings

COATED OPTICAL FIBERS

This application is a divisional of application Ser. No. 11/269,765, filed Nov. 9, 2005, now U.S. Pat. No. 7,706,659; which is a continuation of application Ser. No. 09/989,703, filed Nov. 21, 2001, now U.S. Pat. No. 7,067,564; which is a continuation-in-part of application Ser. No. 09/717,377, filed Nov. 22, 2000 now abandoned, the entire contents of which is hereby incorporated by reference in this application.

FIELD OF THE INVENTION

The present invention relates to a coated optical fiber comprising a primary and secondary coating, to a radiation curable primary coating composition, to a combination of a primary and secondary coating, and to a ribbon comprising at least one of said coated optical fibers and to a method and apparatus for measuring cavitation strength of a coating for use as a primary coating on an optical fiber.

DESCRIPTION OF RELATED ART

Because optical fibers are fragile and easily broken, the optical fibers are usually coated with a coating material which is a radiation curable resin composition. The transmission characteristics of optical fibers are known to be significantly affected by properties such as modulus or the like of the primary coating material which is in direct contact with the optical fibers. When optical fibers are coated with a primary coating material having an equilibrium modulus of about 2 MPa or higher, the transmission loss of the optical fibers may increase because of decreased buffering effect. A material having a low modulus of elasticity is, therefore, desirable as the primary coating material. Primary coating materials having an equilibrium modulus of 1.5 MPa or less are thus of interest as is described for example by Bouten et al. (J. of Lightwave Technology, Vol. 7 April 1989, p. 680-686).

There is a long felt need in the optical fiber industry to use such softer (lower modulus) primary coatings to introduce a higher resistance against microbending and thus to prevent attenuation losses. However, when using such low modulus primary coatings, and in particular, when using primary coatings having a modulus below 1.3 MPa, the strength of the coating is decreased and thus the integrity of the coating is at risk. Hence, such coatings tend to be very fragile and can result in the formation of defects in the coating during processing or use of the coated optical fiber.

It is described in WO99/08975 to prepare primary coatings having a low secant modulus (<1.5 MPa) while having a high tensile strength at break (>1.5 MPa) which are said to protect an optical fiber for a long period of time in a safe and stable manner while obtaining an excellent transmission performance.

However, these coatings need further improvement in strength or integrity because defects still appear during the use of the coated optical fiber, in particular, under the influence of high stresses and temperature extremes which the coated fiber has to withstand over time (during production, cabling or when buried under the ground). This problem is further enhanced nowadays due to the increasing line speeds for fiber drawing causing steeper cooling profiles, and allowing less time for relaxation.

It has now been found that a primary coating having an equilibrium modulus of about 1.5 MPa or lower, when coated on a glass optical fiber and when subsequently having a secondary coating (having a much higher Tg) applied thereon, undergoes at least the following stress: when the temperature decreases during the production process the secondary coating passes its glass temperature (Tg) and enters the glassy state while the primary coating is still above it's glass temperature. The primary coating still intends to shrink when the temperature decreases further, but is captured between the rigid secondary on the one hand and the rigid glass substrate on the other hand. This precludes the shrinking process of the primary coating substantially. This stress can result in loosening of the primary coating from the glass surface if the adhesion is insufficient (as is described by King and Aloisio in J. Electronic Packaging, June 1997, Vol. 119 p. 133-137 in an article titled "Thermomechnical Mechanism for Delamination of Polymer Coatings from Optical Fibers"). During coloring, cabling and possibly in the field, the fibers may be cycled through high and low temperatures, causing comparable stress on the primary coating.

This stress has now been proven to also result in the appearance of defects within the coating. These defects are in fact ruptures within the primary coating itself which have to be regarded as distinct from delaminations at the interface of primary coating and glass. For the purposes of the present invention, such defects in the coating are further called cavitations or cavities.

OBJECT OF THE INVENTION

It is an object of the present invention to obtain an optical fiber coated with a primary and secondary coating, of which the primary coating has a sufficient high cavitation strength while having a low modulus.

Further, it is an object of the present invention to obtain soft primary coatings with an equilibrium modulus of about 1.5 MPa or less having sufficient resistance to cavitation to remain substantially free of cavitations.

It is another object of the invention to provide a method and an apparatus to measure the cavitation strength.

It is a further object of the present invention to obtain a primary coating having an equilibrium modulus of about 1.5 MPa or less and having a low actual stress level.

SUMMARY OF THE INVENTION

The present inventors realized that the integrity of a soft primary coating in a coated optical fiber during use is (a.o.) dependent on its resistance to cavitation.

Therefore, the present invention relates to a coated optical fiber having a primary coating which sufficiently adheres to the optical fiber to reduce to a minimum the occurrence of delaminations (or debonding) at the primary coating-glass interface and wherein the secondary coating sufficiently adheres to the primary coating to reduce to a minimum the occurrence of delaminations at the primary coating-secondary coating interface, wherein said primary coating has a cavitation strength that is sufficient to reduce to a minimum the occurrence of cavitations within the coating itself.

Therefore, the present invention provides a coated optical fiber having a primary coating having a storage modulus at 23° C. ($E'_{23}$), having an equilibrium modulus of about 1.5 MPa or less and having a cavitation strength of at least about 1.40 times its storage modulus at 23° C. ($E'_{23}$), but said cavitation strength having a value of at least 1.0 MPa, while having sufficient adhesion to glass.

A suitable definition of the phenomenon of cavitation strength according to the present invention is the stress at which the tenth cavitation becomes visible when measured in a tensile testing machine at a pulling speed of 20 μm/min for a 100 μm thin layer (or 20% per min) when observed at a magnification of about 20×.

The present invention furthermore provides a coated optical fiber comprising said primary coating and a secondary coating having a Tg of about 40° C. or more and a modulus (1 Hz; storage modulus E' at 23° C.) of about 400 MPa or more.

The present invention furthermore provides a primary coating composition, when cured, having above defined cavitation strength, furthermore the invention provides a primary coating having sufficient strain hardening to substantially increase the resistance to cavitation of the primary coating in comparison to a coating exhibiting "ideal Gaussian rubber" characteristics and/or said primary coating having a sufficient strain energy release rate (Go).

Further, the present invention provides a primary coating having a sufficient low expansion coefficient while having a low modulus and an improved combination of expansion coefficient for a primary-secondary coating system.

The present invention further provides an apparatus for measuring the cavitation strength of a coating and a method for measuring said cavitation strength of a coating for use as a primary coating on an optical glass fiber.

SHORT DESCRIPTION OF PHOTOGRAPHS AND FIGURES

Photograph 1 shows the set up for a cavitation strength measurement.

Photograph 2 shows the top fixture of the cavitation strength measurement set up.

Photograph 3 shows sample of two primary coatings with cavities.

Photograph 4 shows the micrometer set-up used for the sample preparation for the cavitation strength measurement.

FIG. 1 schematically shows an apparatus used for determining the cavitation strength of a sample.

FIG. 2 shows the sample geometry in the cavitation set-up.

FIG. 3 shows the cavitation strength at the tenth cavitation as a function of E'23.

FIG. 4 shows the number of cavitations at increasing stresses on a primary coating sample with precure (0.96 J/cm$^2$+3 precure flashes) and a sample without precure (0.93 J/cm$^2$) (speed 20%/min).

FIG. 5 shows relative Mooney plots of several primary coatings.

DETAILED DESCRIPTION OF THE INVENTION

The primary coating of the present invention has an equilibrium modulus of about 1.5 MPa or less. The equilibrium modulus according to the present invention is measured by DMTA in tension according to ASTM D5026-95a, wherein the modulus is determined as described in the experimental section. Use of such a low modulus primary coating results in an increased resistance against attenuation of the light transported through the glass fiber. This resistance against attenuation is in particular relevant in so called "non zero dispersion shifted single mode optical fibers", and in multimode fibers as these fibers are sensitive to attenuation due to so-called microbending.

Preferably, the equilibrium modulus is about 1.3 MPa or less, more preferred about 1.0 MPa or less, even more preferred about 0.9 MPa or less, and most preferred, about 0.8 MPa or less. In general, the modulus will be about 0.05 MPa or higher, preferably about 0.1 MPa or higher, more preferably about 0.2 MPa or higher, and most preferred, about 0.3 MPa or higher.

In spite of the low modulus, the resistance to cavitation (further called cavitation strength) should be sufficiently high. The present invention now provides primary coating compositions, which when cured result in primary coatings fulfilling the above requirements.

The present invention also provides a method and an apparatus for measuring the cavitation strength, which is the stress at which a defined number of cavitations becomes visible at about 20× magnification. For the purpose of the present invention the stress is measured at which a second, fourth, or tenth cavitation becomes visible at about 20× magnification at a pulling speed of 20 μm/min in a 100 μm thick sample (or 20% min$^{-1}$).

This method and apparatus can then be used to design the primary coatings of the present invention.

The apparatus for measuring the cavitation strength of a coating according to the present invention comprises an assembly comprising:

(i) a first member having a first surface;
(ii) a second member having a second surface opposing said first surface; at least one of said first and said second member being transparent to ultraviolet light; said first surface being moveable in a direction normal towards said second surface; said first surface defining with said second surface a cavity for receiving a sample;
(iii) a sub-assembly in contact with said first member or said second member; said sub-assembly comprising at least one element capable of adjusting the position of said first surface or said second surface in such a manner that said first surface or said second surface is perpendicular to the direction of said normal movement (see FIG. 1).

FIG. 1 schematically shows an apparatus that may be used for determining the cavitation strength of a sample (30), in particular an ultraviolet cured film of ultraviolet curable material. The set up includes a tensile testing apparatus comprising an assembly for holding a sample for testing.

The tensile testing apparatus comprises a load cell (50) for measuring the force that is required to move a moving plate (80) in a normal direction apart from a stationary plate (70). Load cell (50) is attached to the stationary plate (70). The movement of the plate (80) may be guided by bars or a set of bars (100). The tensile testing apparatus may further comprise a displacement transducer (90), which can regulate the speed with which the plate (80) is displaced from the stationary plate (70).

The assembly comprises a first member (10) having a first surface and a second member (20) with a second surface facing said first surface. Thus, said load cell (50) can register the force that is required to move said first surface in a direction normal towards said second surface and said displacement transducer can regulate the speed at which said first surface is normally moved from said second surface. Together, the first and second surface define an area for holding a sample (30). Preferably at least one of the first member and second member is made of a material that is transparent to ultraviolet (UV) light. Materials that are transparent to UV light are well-known in the art and include, for instance, quartz glass. Preferably at least the second member (20) is made of UV transparent material. Preferably, the assembly is capable of receiving a UV curable composition which may be cured in situ.

Generally, both the first and the second member are transparent to the naked eye. The second member is adapted to be attached to load cell (50).

The assembly further comprises a sub-assembly for positioning the first member (10) in a position perpendicular to the direction of the force applied to the sample (30). The sub-assembly has at least one element (40) that can adjust the position of the first member (10) relative to the direction in which the moving plate (80) is displaceable. Such an element may be, for instance, an adjustment screw. Preferably, the sub-assembly comprises at least two adjustment screws, more preferably at least three adjustment screws, and most preferred, at least three micrometer screws on the moving plate and three hardened steel balls fitted to the adjustable plate. The sub-assembly further comprises a ring plate (110) attached to the moving plate (80). The plate is preferably constructed such that it is sufficiently rigid to minimize or eliminate any effect on the measuring of the sample during testing. For example, the plate (80) may be constructed from rigid steel. A bore extends through the plate (110), and also through the moving plate (80), to allow the sample (30) to contact both said first surface of the first member (10) and said second surface of the second member (20). First member (10) is attached to or rests on the ring plate (110). An example of how the sub-assembly can adjust the position of the first member (10) relative to the movement of the plate (80) is given below:

In operation, the adjustment elements (40) in FIG. 1 could be, for example, adjustment screws, such as micrometer screws. Adjusting one of the screws will cause the ring plate (110) to change its angle (or tilt) with respect to the direction of movement (or force imposed on the sample during testing). Since the first member (10) is attached to or rests on the ring plate (110), the first member (10) will also change its angle (or tilt) relative to moving plate (80). Accordingly, the position of the first member (10) relative to the moving direction of the moving plate (80) is adjusted. One of the benefits of the sub-assembly is that it be used to ensure that the position of said first surface of the first member (10) is perpendicular to the moving direction of the moving plate (80).

Preferably, said sub-assembly is capable of adjusting the position in such a manner that both the first member and the second member are perpendicular to the direction of the normal movement or moving direction of the moving plate (80) or, in other words, are parallel to each other (further called parallelity adjustment).

The set up in FIG. 1 further comprises a viewer (60) for optically observing and/or recording a contacting surface of the sample (30) in a direction parallel to the moving direction of the moving plate (80). Such viewer (or viewing means) (60) may be any device suitable for observing the surface contacting either the first or second surface and/or the sample in between. Preferably, the viewer includes a magnifier, such as, for instance, a microscope, a video camera, and/or a microscope in conjunction with a video camera.

The present invention further relates to a tensile testing apparatus comprising the assembly as described above. Said tensile testing apparatus comprising said assembly has a compliance of less than about 0.5 µm/N, preferably, of about 0.4 µm/N or less, more preferred, about 0.3 µm/N or less, and most preferred about 0.2 µm/N or less.

The details of the apparatus for measuring the cavitation strength are further visualized in Photograph 1. In particular, the apparatus is used for measuring the cavitation strength of a primary optical glass fiber coating and comprises, a tensile testing machine having a fixed plate to which a load cell with a lower end sample part (second member (20)) can be fixed, optionally further comprising a displacement transducer, and comprising a moving plate and a top fixture; either the top (first member (10)) sample part or lower sample part (second member (20)) being provided with means to adjust the parallelity of the sample to be perpendicular to the direction of the normal movement (see Photograph 2), the apparatus being further provided with a microscope and preferably also a recorder fitted on said top (moving) plate, the compliance of the total set up of the apparatus being less than about 0.5 µm/N (preferred ranges see above) and wherein the thickness of said top and lower sample part are about 2 mm or more, preferably, about 3 mm or more, more preferably, about 4 mm or more.

The method for measuring the cavitation strength according to the present invention comprises the steps of:

(i) making a sample by treating two plates (each having a thickness of at least 5 mm), preferably at least one quartz plate, by applying a liquid coating in between the two plates in a thickness of between 10 and 300 µm and over a certain area and by curing said coating with a UV-dose, the treatment of the two plates being such that the adhesion between the plates and the cured coating is sufficient to obtain cavitation before debonding sets in, (ii) placing the sample in a tensile testing apparatus, which is provided with a microscope, in such a way that a substantially parallel alignment and an acceptable compliance of the total tensile testing apparatus is obtained, (iii) running a deformation test on said sample while measuring the force at which a defined number of cavities starts to be visible through the microscope at a certain magnification, and (iv) calculating the stress by dividing said force by the area of the coating applied and reporting said stress in relation to said cavities.

Preferably, the coating is cured with such UV-dose that the coating attains at least 85% of its equilibrium modulus (preferably, at least 90%, more preferred, at least 95%). It is preferred to cure the coating with a UV-dose of about 1 J/cm$^2$.

"Debonding" means interfacial failure at the interface between coating and plate. The treatment of the two plates preferably consists of treating the surface with a silane solution containing a silane coupling agent, more preferably by first finely polishing the surface using carborundum powder, most preferred, the treatment as indicated in the description of the test methods under paragraph A.2.

According to a preferred embodiment of the present invention the method for measuring the cavitation strength comprises the steps of:

(i) making a sample by (a) cleaning two plates, preferably glass or quartz plates, more preferred, at least one of which is a quartz plate, each having a thickness of at least 5 mm, (b) preparing the surfaces of said plates, preferably by roughening them, (c) treating the surfaces thereof with a silane coupling agent, (d) providing a coating material between the two plates of at least 0.1 square cm in area, preferably 0.2-1 square cm, in a thickness of between 10-300 µm, preferably of about 100 µm, and (e) curing said coating with UV light in an amount of about 1 J/cm$^2$;

(ii) placing the sample in a tensile testing apparatus which is provided with a microscope, and preferably a video recorder, (iii) running a deformation test at a speed of 0.05-1.00 min$^{-1}$, preferably 0.1-0.5 min$^{-1}$, and most preferred 0.15-0.25 min⁻¹, while measuring the force at which a defined number of cavities starts to be visible through the microscope at 20× magnification, and (iv) calculating the stress by dividing said force by said area and reporting said stress in relation to said cavities.

Photograph 3 shows the appearance of cavities in two samples of primary coatings A and B in a cavitation measurement as a function of the force applied. The cavities can have different forms depending on the type of primary coating. Coating A shows bubble-like cavities whereas coating B shows stripe-like cavities.

The measurement preferably is performed by videorecording the sample during the measurement. The measurement can be performed with a 100 μm thin layer, for which the pulling speed of 20 μm/min can be used to obtain a deformation rate of 0.20 min⁻¹. The deformation rate can be defined by the pulling speed divided by the layer thickness.

Preferably, in the test for cavitation strength, the stress at which, the second, fourth or tenth cavitation becomes visible is taken as the cavitation strength of a coating. In the present invention the tenth cavitation is used as the measuring point.

The cavitation strength at which the tenth cavity appears ($\sigma^{10}_{cav}$) preferably is 1.0 MPa or higher as measured at a deformation rate of 0.20 min⁻¹, of a primary coating sample which has been prepared according to the method described in detail in the experimental section and the cavitation strength preferably is at least 1.4 times the storage modulus at 23° C. ($E'_{23}$) of said primary coating (see FIG. 3).

Therefore, the present invention relates to a primary coating composition when cured having an equilibrium modulus of about 1.5 MPa or less and a cavitation strength at which a tenth cavitation appears ($\sigma^{10}_{cav}$) of at least about 1.0 MPa as measured at a deformation rate of 0.20% min⁻¹, said cavitation strength being at least about 1.4 times said storage modulus at 23° C. ($E'_{23}$). Preferably, the cavitation strength is at least about 1.5 times the storage modulus, more preferably at least about 1.6 times the storage modulus.

This can be achieved in several ways, as explained below in more detail. One way is by introducing strain hardening into the material, such as by introducing bimodality (or multimodality) into the system, or by introducing crystallization under strain. Another way of increasing the resistance to cavitation is by using a two step curing process comprising a first low dose pre-cure step.

The stress which is excerted (in actual use) on the primary coating further depends on the secondary coating. Also, the time over which the stress is exerted has an influence because relaxation can reduce stresses. The latter is shown e.g. by Reddy et al., in the 1993 Proc. of the 42ⁿᵈ WCS p. 386-392. A higher modulus and higher Tg secondary coating will cause greater stress on the primary. Hence, it is preferred that the cavitation strength of the primary coating at which the tenth cavitation $\sigma^{10}_{cav}$ appears is about 1.1 MPa or more, and more preferred about 1.2 MPa or more, and most preferred about 1.3 MPa or more.

The present invention further relates to a coated optical fiber comprising a glass optical fiber, a primary coating applied thereon, a secondary coating and optionally an ink composition subsequently applied thereon, wherein the primary coating is as defined above.

In order to improve the resistance of the primary coating against cavitations to occur, two characteristics appear to be important. A coating should preferably have a strain hardening behavior, and the coating preferably should have a certain strain energy release rate (Go).

Strain hardening can be defined by the behavior of a coating in a tensile test resulting in a stress-strain curve that deviates from an "ideal rubber"-profile, as explained further below. Strain hardening can be measured by a stress-strain curve, and is preferably defined by a curve in a relative Mooney plot (see FIG. 5), as described below.

A relative Mooney plot can be obtained as follows:

The primary measurement is the force-displacement curve, measured according to ISO 37 with a speed of 5 mm/min, preferably 50 mm/min, and more preferred 500 mm/min. At higher speed, it is more certain that the effect of the material can be measured, in particular, when the strain hardening behaviour sets in only at higher strain. From this measurement the engineering stress can be calculated according to formula (1);

$$\sigma_E = \frac{F}{A} \quad (1)$$

where F is the force and A is the initial cross-section of the sample.

The strain λ is calculated by formula (2):

$$\lambda = \frac{l}{l_0} \quad (2)$$

where $l_0$ is the initial length and l the actual length of the prismatic region of the sample under test.

The Mooney stress, $\sigma_M$, can now be calculated from this engineering stress using ("Elastomers and Rubber Elasticity", J. E. Mark and J. Lal, 1982, ACS Symposium Series 193, American Chemical Society Washington D.C.):

$$\sigma_M = \frac{\sigma_E}{\lambda - \frac{1}{\lambda^2}} \quad (3)$$

A Mooney plot can now be constructed by plotting $\sigma_M$ versus 1/λ. A strain hardening material shows an increase in the relatively Mooney stress at lower values of 1/λ. On the contrary, an ideal rubber material does not show this increase in the relatively Mooney stress at lower values of 1/λ. Since the engineering stress for an ideal rubber material is given by the formula $$\sigma_E = E\left(\lambda - \frac{1}{\lambda^2}\right) \quad (4)$$

wherein E is the equilibrium modulus, the Mooney stress $\sigma_M$ of an ideal rubber material is and remains equal to E upon increasing strain λ.

A strain hardening material behaves as a finite extendable spring. It shows a linear elastic behavior under an initial, small strain, but develops a limit in its stretching capacity upon further increase of the strain. From that point, a much higher stress is then required to further stretch the material, and thus, for a cavity to develop and grow. In a relative Mooney plot, this is visible by a rather steep increase in the relative Mooney stress at increasing strain λ.

To be able to compare different materials, the relative Mooney stress is further used. The relative Mooney stress, $\sigma_{rM}$, is now defined as follows. First, determine the minimum of $\sigma_M$ for $1/\lambda \leq 0.8$, which is further denoted as $\sigma_{M,min}$. Then the relative Mooney stress is given by:

$$\sigma_{rM} = \frac{\sigma_M}{\sigma_{M,min}} \qquad (5)$$

The relative Mooney plot can now be constructed by plotting $\sigma_{rm}$ versus $1/\lambda$.

The curve $f(\lambda)$ in the relative Mooney plot (see FIG. 5) will be used to define the primary coatings of the present invention:

$$f(\lambda) = a \frac{L^{-1}\left(\frac{\lambda}{\sqrt{b}}\right) - \lambda^{-\frac{3}{2}} L^{-1}\left(\frac{1}{\sqrt{\lambda}\sqrt{b}}\right)}{\lambda - \frac{1}{\lambda^2}} \qquad (6)$$

where $L^{-1}(x)$ is the inverse of the Langevin function $L(x)$ ("The physics of rubber elasticity", L. R. G. Treloar, second edition, 1967, Oxford at Clarendon press), which is defined as:

$$L(x) = \coth(x) - \frac{1}{x} \qquad (7)$$

The constants a and b are respectively 0.94 and 11.20.

The primary coatings showing strain hardening according to the present invention show a curve in the relative Mooney plot which increases on lowering $1/\lambda$ and of which at least one part has a value higher than the value calculated by using the function $f(\lambda)$ for $1/\lambda$ of about 0.60 or less.

Preferably, at least one part of said curve has a value higher than the value calculated by using $f(\lambda)$ wherein a=0.86 and b=9.85 for $1/\lambda$ of about 0.60 or less.

More preferably, at least one part of said curve has a value higher than the value calculated by using $f(\lambda)$ wherein a=0.78 and b=8.50 for $1/\lambda$ of about 0.60 or less.

Most preferred, at least one part of said curve has a value higher than the value calculated by using $f(\lambda)$ wherein a=0.70 and b=7.15 for $1/\lambda$ of about 0.60 or less.

The above values for $f(\lambda)$ preferably apply for $1/\lambda$ of about 0.55 or less, more preferably, for $1/\lambda$ of about 0.50 or less.

According to a preferred embodiment of the present invention, the strain hardening behavior of a primary coating is more effective in preventing cavities if the strain hardening occurs at lower elongation (or higher $1/\lambda$).

In De Vries et al., Journal of Polymer Science: Polymer Symposium 58, 109-156 (1977) it is described to obtain a stress-strain curve from a biaxial stretching test wherein the applied strain is biaxial in contrast to the uniaxial experiment performed in the above.

For the sake of simplicity, and in order to obtain less noisy profiles, the present inventors have used an uniaxial stretching test wherein the coating test specimen is pulled in uniaxial direction according to ISO 37 under the conditions as described in the experimental section.

One of the other preferred characteristics of the primary coatings of the present invention is to have a certain strain energy release rate Go. The strain energy release rate or tear strength (Go), is the energy required per 1 m² of crack surface in a test specimen of a cured primary coating initially containing a small crack equal to the slit length b as defined in ISO 816.

The strain energy release rate Go depends on the strain rate in a similar manner as the cavitation strength. The strain energy release rate is preferably at least about 20 J/m², as measured at a rate of about $1.10^{-5}$ s$^{-1}$ or less. A higher tear strength aids in precluding the occurring of cavities, in particular if the coating already shows some strain hardening behavior.

Therefore, according to a preferred embodiment of the present invention, the primary coating having an equilibrium modulus of about 1.5 MPa or less, when measured in an uniaxial tensile test and represented in a relative Mooney plot, shows a curve which increases on lowering $1/\lambda$, and of which at least one part has a value higher than the value calculated by using the function $f(\lambda)$ for $1/\lambda$, of about 0.60 or less wherein a=1.17 and b=15.0 and said primary coating has a strain energy release rate Go, as measured at a rate of about $1.10^{-5}$ s$^{-1}$ or less, of higher than $55.0 - 24.0 \times E_{equilibrium}$.

A tear strength Go of over about 150 J/m² generally does not further increase the cavitation strength of a coating. However, the tear strength preferably is about 30 J/m² or more, more preferably about 35 J/m² or more, particularly preferred about 40 J/m² or more, and most preferred about 45 J/m² or more. These Go values preferably apply to primary coatings showing strain hardening by a curve in the relative Mooney plot which increases on lowering $1/\lambda$ and of which at least one part of said curve has a value higher than the value calculated by using $f(\lambda)$ wherein a=1.02 and b=12.55 for $1/\lambda$ of about 0.60 or less, more preferably wherein a=0.94 and b=11.20 for $1/\lambda$ of about 0.60 or less.

Preferably, the primary coating has an equilibrium modulus of about 1.2 MPa or less, more preferably, about 1.0 MPa or less, even more preferably about 0.9 MPa or less, and most preferred about 0.8 MPa or less.

With the primary coatings of the present invention it is possible to make coatings which have a very low modulus and yet have a high level of integrity with respect to cavitation strength.

Furthermore, this invention allows for the design of coating systems in which the secondary coating has a high Tg and/or high storage modulus at 23° C. and the primary has a (very) low equilibrium modulus (preferably, about 1.2 MPa or less, more preferably, about 1.0 MPa or less, even more preferably about 0.9 MPa or less, most preferred about 0.8 MPa or less). The Tg of primary coatings generally is less than about 0° C., preferably, less than about –5° C., more preferred, less than about –10° C., and most preferred, less than about –20° C. (as measured by the first peak tan-δ at 1 Hz in a DMA curve when starting from the high temperature side). In general, the Tg of primary coatings is at least about –80° C., preferably at least about –60° C. High modulus secondary coatings are desirable for certain cable designs. Generally, the Tg of the secondary (as measured by the peak tan-δ in DMTA) is about 40° C. or higher. Preferably, the Tg is about 50° C. or higher, and more preferable about 60° C. or higher. Generally, the Tg will be about 100° C. or lower. The storage modulus E' at 23° C. preferably is about 200 MPa or higher, more preferably between 400-3000 MPa.

The primary coating generally will be a radiation curable coating based on (meth)acrylate functional oligomers and radiation-curable monomers with photoinitiator(s) and additives. Examples of additives include a stabiliser and a silane coupling agent. The adhesion to the glass as measured according to adhesion test described in WO 99/15473, which is incorporated herein by reference, generally is at least about 5 g in force at 50% RH and at 95% RH (Relative Humidity). Preferably, the adhesion is at least about 10 g in force, more preferably at least about 20 g in force, particularly preferred at least about 50 g in force and most preferred at least about 80 g in force, both at 50% RH and 95% RH. The adhesion may be as high as 250 g in force.

The radiation curable coatings of the present invention generally comprise (A) 20-98% by wt. of at least one oligomer having a molecular weight of about 1000 or higher, preferably, 20-80% by wt., more preferably, 30-70% by wt., (B) 0-80% by wt. of one or more reactive diluents, preferably, 5-70% by wt., more preferably, 10-60% by wt., most preferably, 15-60% by wt., (C) 0.1-20% by wt. of one or more photoinitiators for initiation of a radical polymerisation reaction, preferably, 0.5-15% by wt., more preferably, 1-10% by wt., most preferably, 2-8% by wt., (D) 0-5% by wt. of additives, wherein the total amount adds up to 100 wt. %.

Preferably, the oligomer (A) is a urethane (meth)acrylate oligomer, comprising a (meth)acrylate group, urethane groups and a backbone. (Meth)acrylate includes acrylate as well as methacrylate functionality. The backbone is derived from a polyol which has been reacted with a diisocyanate and hydroxy alkyl acrylate. However, urethane-free ethylenically unsaturated oligomers may also be used.

Examples of suitable polyols are polyether polyols, polyester polyols, polycarbonate polyols, polycaprolactone polyols, acrylic polyols, and the like. These polyols may be used either individually or in combinations of two or more. There are no specific limitations to the manner of polymerization of the structural units in these polyols. Any of random polymerization, block polymerization, or graft polymerization is acceptable. Examples of suitable polyols, polyisocyanates and hydroxyl group-containing (meth)acrylates are disclosed in WO 00/18696, which is incorporated herein by reference.

The reduced number average molecular weight derived from the hydroxyl number of these polyols is usually from about 50 to about 25,000, preferably from about 500 to about 15,000, more preferably from about 1,000 to about 8,000, and most preferred, from about 1,500 to 6,000.

The ratio of polyol, di- or polyisocyanate (as disclosed in WO 00/18696), and hydroxyl group-containing (meth)acrylate used for preparing the urethane (meth)acrylate is determined so that, about 1.1 to about 3 equivalents of an isocyanate group included in the polyisocyanate and about 0.1 to about 1.5 equivalents of a hydroxyl group included in the hydroxyl group-containing (meth)acrylate are used for one equivalent of the hydroxyl group included in the polyol.

In the reaction of these three components, an urethanization catalyst such as copper naphthenate, cobalt naphthenate, zinc naphthenate, di-n-butyl tin dilaurate, triethylamine, and triethylenediamine, 2-methyltriethyleneamine, is usually used in an amount from about 0.01 to about 1 wt % of the total amount of the reactant. The reaction is carried out at a temperature from about 10 to about 90° C., and preferably from about 30 to about 80° C.

The number average molecular weight of the urethane (meth)acrylate used in the composition of the present invention is preferably in the range from about 1,200 to about 20,000, and more preferably from about 2,200 to about 10,000. If the number average molecular weight of the urethane (meth)acrylate is less than about 1000, the resin composition tends to vitrify at room temperature; on the other hand, if the number average molecular weight is larger than about 20,000, the viscosity of the composition becomes high, making handling of the composition difficult.

The urethane (meth)acrylate is preferably present in an amount from about 20 to about 80 wt %, of the total amount of the resin composition. When the composition is used as a coating material for optical fibers, the range from about 20 to about 80 wt % is particularly preferable to ensure excellent coatability, as well as superior flexibility and long-term reliability of the cured coating.

Preferred oligomers are polyether based acrylate oligomers, polycarbonate acrylate oligomers, polyester acrylate oligomers, alkyd acrylate oligomers and acrylated acrylic oligomers. More preferred are the urethane-containing oligomers thereof. Even more preferred are polyether urethane acrylate oligomers and urethane acrylate oligomers using blends of the above polyols, and particularly preferred are aliphatic polyether urethane acrylate oligomers. The term "aliphatic" refers to a wholly aliphatic polyisocyanate used. However, also urethane-free acrylate oligomers, such as urethane-free acrylated acrylic oligomers, urethane-free polyester acrylate oligomers and urethane-free alkyd acrylate oligomers are preferred.

Suitable reactive diluents (B) are polymerizable monofunctional vinyl monomers and polymerizable polyfunctional vinyl monomers.

These reactive diluents are disclosed in WO 97/42130, which is incorporated herein by reference.

These polymerizable vinyl monomers are preferably used in an amount from about 10 to about 70 wt %, and more preferred from about 15 to about 60 wt %, of the total amount of the resin composition.

Preferred reactive diluents are alkoxylated alkyl substituted phenol acrylate, such as ethoxylated nonyl phenol acrylate, propoxylated nonyl phenol acrylate, vinyl monomers such as vinyl caprolactam, isodecyl acrylate, and alkoxylated bisphenol A diacrylate such as ethoxylated bisphenol A diacrylate.

Preferably, the photoinitiators (C) are free radical photoinitiators.

Free-radical photoinitiators are generally divided into two classes according to the process by which the initiating radicals are formed. Compounds that undergo unimolecular bond cleavage upon irradiation are termed Type I or homolytic photoinitiators.

If the excited state photoinitiator interacts with a second molecule (a coinitiator) to generate radicals in a bimolecular reaction, the initiating system is termed a Type II photoinitiator. In general, the two main reaction pathways for Type II photoinitiators are hydrogen abstraction by the excited initiator or photoinduced electron transfer, followed by fragmentation.

Examples of suitable free-radical photoinitiators are disclosed in WO 00/18696 and are incorporated herein by reference.

Preferably, the total amount of photoinitiators present is between about 0.10 wt. % and about 20.0 wt. % relative to the total amount of the coating composition. More preferably, the total amount is at least about 0.5 wt. %, particularly preferred, at least about 1.0 wt. %, and most preferred, at least about 2.0 wt. %. Moreover, the total amount is preferably less than about 15.0 wt. %, more preferably, less than about 10.0 wt. %; and particularly preferred, less than about 6.0 wt. %

In one preferred embodiment of the present invention at least one of the photoinitiators contains a phosphorous, sulfur or nitrogen atom. It is even more preferred that the photoinitiator package comprises at least a combination of a photoinitiator containing a phosphorous atom and a photoinitiator containing a sulfur atom.

In another preferred embodiment of the invention, at least one of the compounds (C) is an oligomeric or polymeric photoinitiator.

As an additive (D), an amine compound can be added to the liquid curable resin composition of the present invention to prevent generation of hydrogen gas, which causes transmission loss in the optical fibers. As examples of the amine which can be used here, diallylamine, diisopropylamine, diethylamine, diethylhexylamine, and the like can be given.

In addition to the above-described components, various additives such as antioxidants, UV absorbers, light stabilizers, silane coupling agents, coating surface improvers, heat polymerization inhibitors, leveling agents, surfactants, colorants, preservatives, plasticizers, lubricants, solvents, fillers, aging preventives, and wettability improvers can be used in the liquid curable resin composition of the present invention, as required.

The description can also apply to colored primary coating compositions. The colorant can be a pigment or dye, preferably, a dye.

Radiation curable primary coating compositions are described in for example: EP-A-0565798, EP-A2-0566801, EP-A-0895606, EP-A-0835606 and EP-A-0894277.

In particular low modulus coatings are described in WO99/08975, in WO99/52958, in WO91/03499, and in EP-B1-566801.

The content of these references is incorporated herein, as these references provide the man skilled in the art sufficient information to make low modulus coatings.

The zero shear viscosity at 23° C. of the liquid curable resin composition of the present invention is usually in the range from about 0.2 to about 200 Pa·s, and preferably from about 2 to about 15 Pa·s.

The elongation-at-break of the primary coatings of the present invention is typically greater than about 50%, preferably greater than about 60%, more preferably the elongation-at-break is at least about 100%, more preferably at least about 150% but typically not higher than about 400%. This elongation-at-break can be measured at a speed of 5 mm/min, 50 mm/min or 500 mm/min respectively, preferably at 50 mm/min.

In order to make the effect of strain hardening visible in the present uniaxial test, the elongation-at-break of the primary coatings should preferably be at least about 100%.

According to one embodiment of the present invention one way of improving the cavitation strength is by introducing bimodal (or multimodal) distribution of the molecular weight of the multifunctional cross-linking components (further called bi- or multimodality), in other words, by a primary coating composition comprising at least one cross-linking component introducing bimodality into the system. Bimodality means that the system network contains chains of at least two different lengths between the junctions of the network.

In contrast to the normal practice in radiation curable oligomer synthesis wherein the low Mw-fractions are restricted to a minimum or avoided, it is preferred according to the present invention to modify the Mw-distribution by introducing a sufficient amount of a low Mw oligomer or multifunctional monomer to obtain the desired cavitation strength and/or strain hardening.

This can be achieved (a.o.) by using at least two oligomers, preferably, oligomer diacrylates, with a different average molecular weight, preferably the average molecular weight of the one oligomer being on average 2 times higher than the molecular weight of the other oligomer, more preferably being on average at least 5 times higher, most preferred, at least 10 times higher; another possibility is by using a tri- or tetrafunctional oligomer, still another option is by using three oligomers with a different average molecular weight, further called trimodality. In the latter case, it is preferred that the average molecular weight of the one oligomer is on average 1.5 times higher than the molecular weight of the second oligomer and the average molecular weight of the second oligomer is on average 1.5 times higher than the average molecular weight of the third oligomer, more preferably the average molecular weight between the oligomers doubles, most preferably, the average molecular weight of the three oligomers differs at least 5 times. An alternative option—which is preferred—is by using a multifunctional (for example difunctional or multifunctional) reactive diluent in an amount sufficient to achieve the desired cavitation strength characteristics. A further option is to use a combination of at least two di- or multifunctional acrylates of low Mw (reactive diluents).

Mori et al. describe (in RadTech proceedings 1998, USA) the use of up to 4% of difunctional acrylate diluents in a primary coating. These coatings however, have a too high equilibrium modulus.

EP-A-0311186 and EP-A-0167199 describe the use of 6% or 9.5% of a difunctional acrylate in a low modulus primary. However, these coatings show a decrease in equilibrium modulus after aging at 95° C. for 30 days of more than 60%. Moreover, these coatings show strong yellowing upon aging under fluorescent light for 30 days. None of the references suggest anything on resistance to cavitation.

The primary coatings of the present invention show a decrease in equilibrium modulus after aging for 30 days at 95° C. of less than 50%, preferably, less than 45%, more preferably, less than 40%. Preferably, their $E'_{1000}$ (temperature at which their storage modulus equals 1000 MPa) decreases by less than about 10° C. under the above aging conditions, more preferably, less than about 7° C.; their E'100 (temperature at which their storage modulus equals 100 MPa) decreases by less than about 20° C. under the above aging conditions, more preferably, less than about 15° C.

Preferably, the primary coatings of the present invention show, upon aging for 30 days in fluorescent light (4 mW/cm$^2$), a non-yellowing value DE of about 20 or less, more preferably, about 15 or less. The 30 days aging test was performed using a daylight L 35 W/11 Lumilux lamp available from Osram, at such a distance that the energy at the surface of the coating is 4 mW/cm$^2$ as measured using a ML 1400 radiometer available from Miltec comprising an IL 1740B Photoresist. The color change delta E value of the cured films is measured by conventional methods as disclosed in the publication entitled "A Measurement of the Contribution of UV Cured Coatings and Ink Binders Towards Color Change of UV Cured Inks" by D. M. Szum in Radtech Europe '93 Conference Proceedings (papers presented at the Radtech Europe Conference held May 2-6, 1993), the complete disclosure of which is hereby incorporated by reference. This publication discloses measurements which were performed on three layer samples, whereas the samples of the present invention were single layers. The measurement involves a mathematical manipulation, FMC-2.

According to a further preferred embodiment of the present invention the primary coatings (75 µm films cured in nitrogen at 1 J/cm² using one D lamp; UV-dose determined with a "Light Bug" manufactured by International Light, Inc.; wavelengths measured 257-390 nm) show a hydrogen generation (24 hours at 80° C. in argon) of about 0.3 µl/g or less, more preferred, about 0.25 µl/g or less, even more preferred, about 0.20 µl/g or less.

Another preferred way of increasing the resistance against cavitation is to lower the amounts of non-load bearing material, more in particular, of monofunctional (low Mw) acrylates, generally having a Mw below about 1000, more preferably below about 700, even more preferably below about 600, particularly preferred below about 500, most preferred below about 400. The amount of monofunctional acrylate preferably is about 10 wt. % or less, more preferably about 8 wt. % or less, even more preferred about 5 wt. % or less, particularly preferred about 4 wt. % or less, and most preferred about 3 wt. % or less. The monofunctional acrylate is preferably present in an amount of at least about 0.5 wt. %, more preferably at least about 1 wt. %, even more preferred at least about 1.5 wt. %. Any modulus increase can be compensated by increasing the molar mass of the oligomer diacrylate. Preferably, this measure is carried out in addition to introducing a certain amount of strain hardening (such as for example by introducing bimodality) into the coating system.

Both strain hardening and tear strength are increased by introducing a bimodal coating composition. It is preferred to use a sufficient amount of a difunctional component with a molecular weight of about 1000 or less to obtain the required strain hardening or tear strength. The amount of low molecular weight multifunctional diluent [preferably difunctional diluent, trifunctional diluent, long chain trifunctional diluent or a combination thereof] preferably is about 1.6 wt % or higher, more preferably about 1.8 wt % or higher, most preferred about 2.5 wt % or higher. Generally, the amount will be less than about 15 wt %, preferably less than about 9 wt % if the molecular weight of the difunctional diluent is less than about 500. Alkoxylated diol diacrylates are preferred in the coatings of the present invention.

Suitable examples of dioldiacrylates include hexanediol diacrylate, ethoxylated bisphenol-A diacrylate, tripropylene glycoldiacrylate and the like. The at least one oligomer preferably has a molecular weight of about 4000 or more, more in particular of about 5000 or more. Generally, in view of viscosity requirements, the molecular weight is about 20,000 or less, preferably about 15,000 or less, more preferably about 10,000 or less. Any oligomer can be used, but wholly aliphatic polyether urethane oligomers are preferred. Also, polyether/polyester and polyether/polycarbonate combined urethane acrylate oligomers are preferred.

Another way of introducing the desired strain hardening into the coating of the present invention is by introducing crystallization under strain. Upon stretching the network, the network chains crystallize and thus stiffen the material in situ.

The resistance to cavitation can also be improved by a two step curing process, in which the coating is partly cured with a very low first dose (5-50 mJ/cm², hereinafter called pre-cure), and thereafter cured with a dose of at least about 50 mJ/cm². The time period between the first and second dose preferably is 2-120 sec. On a draw tower, the time period between the first and subsequent doses preferably is much shorter, preferably between $1.10^{-3}$ and 5 sec. Therefore, the time period between the first and subsequent doses preferably is between about $1.10^{-3}$ and about 120 sec. It is preferred to pre-cure the coating with one or more short flashes of a UV-source resulting in a total dose of about 0.01 J/cm² or less (see FIG. 4).

The following UV-source is generally used for applying the dose of more than 50 mJ/cm²: a Fusion F600 W system having as lamps 1600M radiator (600 W/inch which equals 240 W/cm, and thus, in total 6000 W) fitted with R500 reflector one, with a H bulb and one with a D bulb. For the purposes of our invention, only the D-lamp is used to cure the samples.

A laboratory Macam lamp that is a 400 W metal halide lamp (Macam, Flexicure system) is used to pre-cure the film with short preflashes. UV light is fed into the cell by a liquid filled light guide, resulting in a cut-off of the wavelengths below 260 nm (having a wavelength shorter than 260 nm). Hence, it is preferred that the precure is performed with a first lamp having a different spectrum than the second lamp. On a draw tower this first lamp can be the lamp or lamps that cure the primary coating before applying the secondary coating.

Thus, according to one embodiment, the present invention relates to a method for curing a primary coating composition, said method comprising the steps of (i) preparing a primary coating composition, which when cured without preflash is having an equilibrium modulus of about 1.5 MPa or less and a cavitation strength at which a tenth cavitation appears ($\sigma^{10}_{cav}$) of at least about 0.9 MPa (preferably at least about 1.0 MPa) as measured at a deformation rate of 0.20% min$^{-1}$, said cavitation strength being about 1.0 times or less (preferably, at least 1.1. times or less, more preferred at least 1.2 times or less, most preferred at least 1.3 times or less) of its storage modulus at 23° C. ($E'_{23}$), and (ii) curing said composition with a first dose comprising at least one flash of UV-light of a total energy between about 5 and 50 mJ/cm² and (iii) subsequently curing the pre-cured coating with such a second UV-dose that the pre-cured coating attains at least 85% of its maximum attainable equilibrium modulus, preferably, at least 90%, more preferably, at least 95% of its maximum attainable equilibrium modulus.

Preferably, said first dose comprises at least one flash of UV-light having a cut-off of the wavelengths below 260 nm, preferably below 250 nm. The second UV-dose preferably does not contain a cut-off of the lower wavelengths, and thus, also contains wavelengths extending below 260 nm, more preferred below 250 nm, most preferred below 240 nm.

The resistance to cavitation of the primary coating on a fiber can also be improved—independently of increasing the cavitation strength—by tuning the volumetric thermal expansion coefficient of the low modulus primary coating of the present invention, and optionally, of both the primary and secondary coating.

Therefore, another aspect of the present invention relates to a method for decreasing the volumetric thermal expansion coefficient of the low modulus primary coatings of the present invention, to a method for tuning the volumetric thermal expansion coefficients of both the primary and secondary coatings that are used together as a system, and to such improved low modulus primary coatings as such.

The volumetric thermal expansion coefficient $\alpha_{23}$ of a coating at 23° C. can be defined by the following formula (8):

$$\alpha_{23} = 1/V(\delta V/\delta T) \tag{8}$$

wherein V represents the specific volume (m³/kg) or the inverse of the density of the system, ($\delta V/\delta T$) represents the change in specific volume of the system as a function of the temperature and T=23° C. In the present invention, $\alpha_{23}$ is calculated by using the Synthia software of MSI as explained further below.

It is accepted that a decrease in the volumetric expansion coefficient of the primary coating results in less shrinking of the primary when the temperature is lowered and thus in less stress exerted on the primary coating as confined between the glass substrate and secondary coating.

It is furthermore generally accepted in the fiber coating field that for polymeric materials the thermal expansion coefficient and the Young's modulus (called the "segment modulus" for primary coatings) are interrelated, see E. Suhir, J. Lightwave Technology, 8, 863 (1990) and M. H. Aly, A. M. Shoaeb, M. Reyad, J. Opt. Commun. 2, 82 (1998). Often, the following linear relationship (9) is taken:

$$\alpha_1 = \alpha_\bullet \left(1 - \frac{E_1}{E_\bullet}\right) \quad (9)$$

with:

$\alpha_1$, $\alpha_\bullet$: the thermal expansion coefficient of the material of interest, respectively a reference material with low Young's modulus $E_1$, $E_\bullet$: the Young's modulus of the material of interest, respectively a reference material with low Young's modulus It was an object of the present invention to reduce the stress level in the primary coating (and thus indirectly improve the cavitation strength of the primary coating) and thus, to decrease the volumetric thermal expansion coefficient $\alpha_{23}$ of the primary coating while keeping its modulus low (and nearly constant).

The present inventors have now found that the Young's modulus and thermal expansion coefficient $\alpha_{23}$ are not interrelated for the primary coatings of the present invention. Since the storage modulus $E'_{23}$, which is the modulus measured in a dynamic (DMTA) measurement, is nearly identical with the Young's modulus at 23° C., the same conclusion holds for the relation between $\alpha_{23}$ and the storage modulus $E'_{23}$. The Young's modulus and the storage modulus $E'_{23}$ are related to the network topology of a primary coating system at 23° C., or alternatively the network density of the coating system.

Furthermore, the thermal expansion coefficient for primary and secondary coating systems is related to the cohesive energy density, defined as the total amount of non-covalent interactions in the system, such as hydrogen bonding or dipolar interactions. Alternatively, one could say that the volumetric expansion coefficient is related to the polarity of the system and not to the network density.

Therefore, according to one particular embodiment of the present invention, and in particular, for primary coatings having an equilibrium modulus of 1.5 MPa or less, the expansion coefficient $\alpha_{23}$ of the primary coating system can be decreased without having to increase the modulus of the primary coating system, preferably by increasing the cohesive energy density (CED) or the polarity of the system.

According to a preferred embodiment of the present invention, the combined primary/secondary coating system comprises a primary coating having a sufficiently low expansion coefficient $\alpha_{23}$ and a secondary coating system having a sufficiently high $\alpha_{23}$ so that the stress level in the primary coating is reduced to a level below the level of the cavitation strength of the primary coating. Preferably, the stress level is below 0.8 MPa or below 1.2 times it's storage modulus at 23° C. ($E'_{23}$), more preferably below 0.5 MPa or below 0.9 times its $E'_{23}$, and most preferred, the combination of primary and secondary coating is chosen such that the stress level in the primary coating is approximately zero.

The thermal expansion coefficient $\alpha_{23}$ for several coating systems can be predicted on the basis of chemical structural information by using commercial software packages: the module Synthia of MSI (Molecular Simulations Inc, San Diego, Calif.) in combination with the Builder module of MSI. Synthia version 8.0 and the standard Builder module within the Insight II (4.0.0P) graphical environment were used. The computations were performed on a Silicon Graphics O2 workstation under a Unix based operating system. The builder module is applied for the construction of the chemical monomer species that will serve as input for the Synthia module. This module Synthia is based on a methodology developed by J. Bicerano that is explained in detail in his monograph (J. Bicerano, *Prediction of polymer properties*, Marcel Dekker Inc., New York, 1993). This methodology makes use of compositional information, i.e. the chemical monomer structure, for the prediction of polymer properties. In particular, connectivity indices based on graph theory are used. This methodology is developed for the prediction of properties, among these properties the thermal expansion coefficient, of linear amorphous homopolymers and for linear alternating and random amorphous copolymers. The term linear refers to non-crosslinked systems. The primary coatings according to the present invention may be treated as linear copolymers because their thermal expansion coefficient depends on the cohesive energy density, and thus most significantly on the polarity and not on the network characteristics of the coatings. The polarity is identical for a network system or it's linear analogue. So, this linear analogue, a linear statistical copolymer is constructed based on the chemical recipe of the coatings. The software program calculates the thermal expansion coefficient at 23° C. ($\alpha_{23}$).

According to one preferred embodiment of the present invention, the primary coatings having an equilibrium modulus E of about 1.5 MPa or less have a volumetric expansion coefficient $\alpha_{23}$ of about $6.85 \times 10^{-4} K^{-1}$ or less, preferably about $6.70 \times 10^{-4} K^{-1}$ or less, more preferred about $6.60 \times 10^{-4} K^{-1}$ or less, even more preferred about $6.50 \times 10^{-4} K^{-1}$ or less, and most preferred about $6.30 \times 10^{-4} K^{-1}$ or less. Said primary coatings show an enhanced resistance to cavitation. Moreover, such primary coating compositions surprisingly show an enhanced reactivity and photosensitivity, and consequently a higher cure speed.

Preferably, the volumetric expansion coefficient of the secondary coating $\alpha_{23}$ of the present invention used in combination with the primary coating of the present invention is at least about $3.15 \times 10^{-4} K^{-1}$, preferably, at least about $3.20 \times 10^{-4} K^{-1}$, more preferably at least about $3.30 \times 10^{-4} K^{-1}$, even more preferred about $3.50 \times 10^{-4} K^{-1}$, and most preferred at least about $4.0 \times 10^{-4} K^{-1}$. The higher the $\alpha_{23}$ of the secondary coating used in combination with a primary coating, the less stress is excerted on the primary coating.

On the other hand, it is desired that the $\alpha_{23}$ of the secondary coating is about $6.85 \times 10^{-4} K^{-1}$ or less. Surprisingly, such a secondary coating composition shows enhanced reactivity and photosensitivity, and consequently a higher cure speed. Thus, by tuning the $\alpha_{23}$ of the secondary coating a desirable balance between an acceptable stress level in the primary coating and an acceptable cure speed of the secondary can be achieved. More preferably, $\alpha_{23}$ of the secondary coating is about $6.5 \times 10^{-4} K^{-1}$ or less, particularly preferred, about $6.2 \times 10^{-4} K^{-1}$ or less, more preferred about $6.0 \times 10^{-4} K^{-1}$ or less, and most preferred about $5.8 \times 10^{-4} K^{-1}$ or less.

The relation between $\alpha_{23}$ and rate (cure speed) is shown for the following secondary-type coatings U, V, W and Z as shown in Table 1. The polarity decreases going from composition U to Z. Said coatings have been prepared with an identical concentration of double bonds, and with a same amount of di- or higher functional material, thus having the same cross link density. The rate has been measured by RT FTIR as described in paragraph F of the description of test methods.

TABLE 1 relation between $\alpha_{23}$ and cure speed of secondary-type coatings U-Z

| Coating composition Components | U Wt. % | V Wt. % | W Wt. % | Z Wt. % |
|---|---|---|---|---|
| HEA-IPDI-pTHF1000-IPDI-HEA | 50 | 50 | 50 | 50 |
| HEA | 32.8 | 32.8 | | |
| HEA-IPDI-5CC | 17.2 | | | |
| SR504 | | 17.2 | 5.5 | |
| Butyl acrylate | | | | 31 |
| Lauryl acrylate | | | | 19 |
| Ethoxy ethyl acrylate | | | 44.5 | |
| Irgacure 184 | 1 | 1 | 1 | 1 |
| Calculated $\alpha_{23}$ ($\times 10^{-4}$ K$^{-1}$) | 6.42 | 6.71 | 7.04 | 7.35 |
| Rate (mol/l sec) | 2.99 | 2.67 | 2.50 | 2.29 |

Abbreviations and tradenames: HEA = 2-hydroxyethylacrylate; IPDI = isophorone diisocyanate; pTHF = polytetrahydrofuran having Mn of 1000; SR504 = ethoxylated (n = 4) nonyl phenol acrylate; Irgacure 184 = photoinitiator; HEA-IPDI-5CC = adduct of HEA, IPCI and

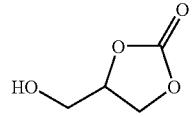

The results in Table 1 show that the cure speed increases upon decreasing volumetric expansion coefficient (and thus upon increasing polarity) of the coating system.

Suitable coating compositions preferably contain one or more of the following constituents: one or more reactive diluents selected from the group consisting of 1-(2-hydroxypropyl)3-phenoxy acrylate, vinyl caprolactam, vinyl pyrrolidone, N butylurethane O ethyl acrylate (CL1039), butyrolactone acrylate, acryloyloxy-dimethyl-butyrolactone, and the like, or mixtures thereof; one or more oligomers selected from the group consisting of polyether (urethane) acrylate, polyester (urethane) acrylate, polyether/polycarbonate copolymer based (urethane) acrylate, polyether/polyester copolymer based (urethane) acrylate and the like, of which, an ethylene oxide/butylene oxide based urethane acrylate and a polyether/polycarbonate copolymer based urethane acrylate are preferred.

The MSI Synthia software has also been used to calculate $\alpha_{23}$ of the primary coatings A, B and C, results are given in Tables 2 and 3.

Additionally, the coefficient of expansion of these UV-curable primary coatings have been measured by TMA (Thermo mechanical analysis) measurements (see Table 2): a 200 μm (=L, thickness) layer was applied between two quartz cups with a diameter of 9.5 mm, and cured with a dose of 1 J/cm$^2$. The heating rate was 2.5° C./minute, and measurements were performed from −60° C. to +80° C. From the ΔL/L (relative thickness change) the volumetric expansion coefficient $\alpha_{23}$ at 23° C. was calculated. The measurement was corrected for quartz expansion by substracting blanco curves.

TABLE 2

Volumetric expansion coefficients at 23° C. of primary coatings

| Coating | E'$_{23}$ (MPa) | $\alpha_{23}$ ($\times 10^{-4}$ K$^{-1}$) calculated | $\alpha_{23}$ ($\times 10^{-4}$ K$^{-1}$) experimentally by TMA |
|---|---|---|---|
| A | 0.4 | 7.89 | 8.0 |
| B | 1.1 | 7.01 | 7.0 |

The data show that the calculated and measured values for $\alpha_{23}$ are well in agreement.

TABLE 3 independency of $\alpha_{23}$ of primary coatings B and C from the modulus

| Coating | E'$_{23}$ (MPa) | $\alpha_{23}$ ($\times 10^{-4}$ K$^{-1}$) calculated |
|---|---|---|
| B | 1.1 | 7.01 |
| C | 0.7 | 6.89 |

The data for primary coatings B and C show that even upon decrease of the modulus of the primary coating system, the $\alpha_{23}$ can be remained substantially unchanged, and hence, that while having a low modulus, the $\alpha_{23}$ can remain low to reduce the stress on the primary coating.

TABLE 4 independency of $\alpha_{23}$ of coatings D to F from the modulus

| Coating | Oligomer/reactive diluent/PI (wt %/wt %/wt %) | E'$_{23}$ (MPa) | $\alpha_{23}$ ($\times 10^{-4}$ K$^{-1}$) calculated |
|---|---|---|---|
| D | 28.5/68.5/3.0 | 0.62 | 7.33 |
| E | 48.5/48.5/3.0 | 1.43 | 7.12 |
| F | 68.5/28.5/3.0 | 2.59 | 6.92 |

Coatings D to F each contain as the oligomer, an aliphatic polyether-polycarbonate based urethane acrylate oligomer having an average Mw of 4000, as the reactive diluent, diethylene glycol ethyl hexyl acrylate, and as the photoinitiator, Irgacure 184. The data for coatings D, E and F show that even upon a major decrease of the modulus (from E'23=2.59 MPa for coating F to 0.62 MPa for coating D), the $\alpha_{23}$ only increases to a minor extent. This increase is primarily due to the slight change in polarity of the coating system going from coating F to D and is thus, independent of the modulus change.

In general, optical fibers are coated first with a primary coating and subsequently with a secondary coating. The coatings can be applied as a wet-on-wet system (without first curing of the primary) or as a wet-on-dry system. The primary coating can be colored with a die, or secondary coatings can be colored with pigments or dies, or a clear secondary can be further coated with an ink. The primary and secondary coatings generally have a thickness of about 30 μm each. An ink coating generally has a thickness of about 5 μm (3-10 μm).

The coated and preferably colored optical fibers can be used in a ribbon comprising a plurality of said optical fibers, generally in a parallel arrangement. The plurality of optical fibers is further coated with one or more matrix materials in order to obtain a ribbon. The present invention therefore further relates to a ribbon comprising a plurality of coated and preferably colored optical fibers, generally in a parallel arrangement, said coated optical fiber comprising at least a primary coating according to the present invention and preferably a secondary coating according to the present invention.

The invention will be further elucidated by the following examples and test methods.

Description of Test Methods

A. Measurement of Cavitation Strength

1. Measurement Set Up

The measurement set up consists of a digital tensile testing machine ZWICK 1484 with digital control and with a video camera fitted on the top (moving) plate of the machine (see Photograph 1). The sample is held in place by a fixture connected to the load cell. The growth of the cavitations can then be followed in real time.

In order to obtain reproducible values of the cavitation strength, two major points should be kept in mind concerning the measurement set up itself. First, the parallellity of the set up is very important to allow a correct translation between the force at which cavitation starts and the actual stress level in the cured coating. In the case of a good parallellity of the plates, the stress distribution over the film will be nearly flat, the coating layer is then (approximately) subjected to a homogeneous triaxial stress level $\sigma$, equal to the ratio (force/sample area).

If the alignment of the set up is imperfect, however, the sample may experience a torque resulting in an inhomogeneous tearing of the polymer film. In this case, the inhomogeneous stress distribution makes it difficult to translate the registered force signal into the actual stress in the film.

The parallelity can be finely adjusted using three micrometer screws on the moving plate of the tensile testing machine (Photograph 2). Circular glass plates (40 mm in diameter, at least 5 mm in thickness) were used (FIG. 2) and by using three hardened steel balls fitted to the adjustable plate one can—within the accuracy of the micrometer screws, about 1 μm—adjust the parallelity of the sample in the measurement set up.

Another important factor is the stiffness of the entire set up: the compliance of the measurement set up should be as low as possible to avoid any storage of elastic energy in the measurement set up. The adjustable plate was therefore made of 15 mm thick steel resulting in a compliance of approximately 0.2 μm/N for the total set up. The compliance is measured by using a welded steel sample having the same geometry as in FIG. 2 and is determined from the measured force and displacement.

2. Sample Preparation

All glass plates (boro silicatum glass) and quartz billets were finely polished using carborundum powder to such an extent that the roughness (Ra) of the glass plates has a value of 1.17±0.18 μm and the roughness (Ra) of the quartz billets has a value of 1.18±0.04 μm. Subsequently, the glass and quartz pieces were burned clean in an oven at 600° C. for one hour and the surfaces were rinsed with acetone and allowed to dry. The clean surfaces were kept in a closed container to avoid dust settling.

The surfaces were treated with a silane solution as follows:

A Preparation of Silane Solution

A 95% ethanol-5% water solution was adjusted to pH 4.5-5.5 with acetic acid, and a silane (Methacryloxypropyltrimethoxysilane, A174 from Witco) was added to yield a 5% silane solution (ca. 74.39% wt ethanol/3.84% wt water/16.44% wt acetic acid/5.32% wt silane). The silane solution was left for five minutes at room temperature to allow hydrolysis and silanol formation. The fresh silane solution was applied to the glass or quartz surfaces by using pipette. The silane layer was cured by placing the treated glass or quartz plates in an oven at 90° C. for five to ten minutes. The treated glass or quartz plates were rinsed free of excess materials by gently dipping in ethanol.

The example was assembled as follows:

A quartz cup was attached to the top plate of the two-plate micrometer using a vacuum system (vacuum pump) (Photograph 4).

The micrometer was zeroed using both the quartz billet and the glass plate. A droplet of resin was gently placed in the middle of the glass plate.

The glass plate was placed on the lower plate of the two-plate micrometer and the film thickness was adjusted by slowly pushing the quartz billet onto the resin droplet. Subsequently, the sample was cured with a 1 J/cm$^2$ UV-dose of Fusion F600 W UV-lamp system having as lamps 1600M radiator (600 W/inch which equals 240 W/cm, and thus, in total 6000 W) fitted with R500 reflector, one with a H bulb and one with a D bulb UV lamp, of which the D-bulb was used to cure the samples.

The samples were stored in a dark place, so that no post-cure by UV-light can take place.

Cured samples were measured within 1-2 hours after preparation.

3. Measurement

The sample was placed in the tensile testing apparatus from ZWICK type 1484.

When an experiment was started, a video camera recorded the behavior of the film while showing the stress exerted on the film. Unless otherwise stated, the pulling speed was 20 μm/min. The microscope was used to achieve about 20× magnification (the 9.5 mm sample was enlarged to 19 cm at the video screen). From the videotape, the appearing of a number of cavities at a certain measured stress was noted.

Sample Preparation for all Measurements Under Paragraphs B-E

The samples were cured with a 1 J/cm$^2$ UV-dose of a Fusion F600 W UV-lamp system (measured with AN international Light 390-bug) as described under paragraph A above using a D bulb at a belt speed of 20.1 m/min.

B. Measurement of Equilibrium Modulus, Storage Modulus at 23° C. (E'23) and Glass Transition Temperature in DMTA The equilibrium modulus of the primary coatings of the present invention is measured by DMTA in tension according to the standard Norm ASTM D5026-95a "Standard Test Method for Measuring the Dynamic Mechanical Properties of Plastics in Tension" under the following conditions which are adapted for the coatings of the present invention.

A temperature sweep measurement is carried out under the following test conditions:

| | |
|---|---|
| Test pieces: | Rectangular strips |
| Length between grips: | 18-22 mm |
| Width: | 4 mm |
| Thickness: | about 90 μm |
| Equipment: | Tests were performed on a DMTA machine from Rheometrics type RSA2 (Rheometrics Solids Analyser II) |
| Frequency: | 1 Hz |
| Initial strain: | 0.15% |
| Temperature range: | starting from −130° C. heating until 250° C. |
| Ramp speed: | 5° C./min |

-continued

| | |
|---|---|
| Autotension: | Static Force Tracking Dynamic Force |
| | Initial static Force: 0.9 N |
| | Static > Dynamic Force 10% |
| Autostrain: | Max. Applied Strain: 2% |
| | Min. Allowed Force: 0.05 N |
| | Max. Allowed Force: 1.4 N |
| | Strain adjustment: 10% (of current strain) |
| Dimensions test piece: | Thickness: measured with an electronic Heidenhain thickness measuring device type MT 30B with a resolution of 1 µm. Width: measured with a MITUTOYO microscope with a resolution of 1 µm. |

All the equipment is calibrated in accordance with ISO 9001.

In a DMTA measurement, which is a dynamic measurement, the following moduli are measured: the storage modulus E', the loss modulus E", and the dynamic modulus E* according to the following relation $E^* = (E'^2 + E''^2)^{1/2}$.

The lowest value of the storage modulus E' in the DMTA curve in the temperature range between 10 and 100° C. measured at a frequency of 1 Hz under the conditions as described in detail above is taken as the equilibrium modulus of the coating. The storage modulus E' at 23° C. in the DMTA curve is taken as E'23.

C. Measurement of Stress/Strain Curves, and Description of Relative Mooney Plots A relative Mooney plot can be obtained as follows:

C.1. Stress/Strain Curve from an Uniaxial Tensile Test

The primary measurement is the force-displacement curve, measured according to International Standard ISO 37 (third edition 1994-05-15)

"Rubber, vulcanised or thermoplastic—Determination of tensile stress-strain properties" which is an uniaxial tensile test. The following conditions are applied for the primary coatings of the present invention:

| | |
|---|---|
| Test pieces: | Dumb-bell piece: type 3 |
| Initial length lo: | about 18-20 mm |
| Thickness: | about 90 µm |
| Equipment: | Tests were performed on a tensile machine from ZWICK type 1484 |
| Force cell: | 50 N |
| Elongation: | Measured with an optical device with a resolution of 0.002 mm/measured increment |
| Type of clamps: | Keilchraub-Problemhalter 8106.00.00 $F_{max}$ = 500 N |
| Test speed: | between 0.1-500 mm/min, depending on the property measured |
| Dimensions dumb-bell: | Thickness: measured with an electronic Heidenhain thickness measuring device type MT 30B with a resolution of 1 µm Width: measured with a MITUTOYO microscope with a resolution of 1 µm |
| Test temperature: | 23° C. ± 2° C. at 50% RH ± 10% |
| Number of specimen: | Between 3 and 5 |

All the equipment is calibrated in accordance with ISO 9001.

C.2. Relative Mooney Plot

The above force-displacement curve is measured using a clamp displacement speed of 5 mm/min, 50 mm/min or 500 mm/min. Preferably at 500 mm/min because at higher speed, the effect of the material (strain hardening effect) can be visualized better, in particular in case of materials for which the strain hardening sets in only at higher strain. From this measurement the engineering stress is calculated according to formulas (1)-(6) as given in the description.

D. Measurement of Strain Energy Release Rate or Tear Strength (Go)

The strain energy release rate Go is measured according to the International Standard norm ISO 816 (second edition 1983-12-01) "Rubber, vulcanized—Determination of tear strength of small test pieces (Delft test pieces)" under the following specific conditions:

| | |
|---|---|
| Test pieces: | in accordance with the ISO 816 |
| Length between grips: | 50 mm |
| Thickness (d): | about 90 µm |
| Slit length (b): | length of initial crack is defined in ISO 816 |
| Equipment: | Tests were performed on a digital tensile machine from ZWICK type 1484 |
| Type of clamps: | Keilchraub-Probenhalter 8106.00.00 $F_{max}$ = 500 N |
| Force cell: | 50 N |
| Elongation: | Measured with machine displacement with a resolution of 0.01 mm/measured increment |
| Test speed: | 0.1 mm/min |
| Dimensions test piece: | Thickness (d): measured with an electronic Heidenhain thickness measuring device type MT 30B with a resolution of 1 µm Width (B): measured with a MITUTOYO microscope with a resolution of 1 µm |
| Test temperature: | 23° C. ± 2° C. at 50% RH ± 10% |
| Number of specimen: | Between 3 and 5 |

All the equipment is calibrated in accordance with ISO 9001.

The strain energy release rate Go is the energy required per 1 m² crack in the above described test specimen of a cured primary coating initially containing a small crack equal to slit length b as defined in ISO 816. Go is then calculated as follows:

$$Go = \frac{\left(\frac{Fbreak}{B \cdot d} \cdot C \cdot \sqrt{\pi \frac{b}{2}}\right)^2}{E} \quad (10)$$

wherein $F_{break}$ is the force at break, b is the slit length, d is the thickness and B the width of test piece, and E is the segment modulus at test speed of 0.1 mm/min as calculated from the stresses at elongation of 0.05 and 2% in test method as described in paragraph C.1 and wherein C defines the sample geometry as follows:

$$C = \sqrt{\frac{1}{\cos\frac{\pi b}{2B}}} \quad (11)$$

E. Measurement of Adhesion Testing

The adhesion of cured samples on a glass plate at 50% relative humidity and 95% relative humidity were tested using a universal testing instrument, INSTRON Model TTD. The load cell had a ten pound (3732 gram) capacity. Glass plates, polished, 20×20 cm, (Alletch Associates catalog number 26080) were used. The test material was applied to the glass plates and cured at 1 J/cm² with a Fusion D Lamp under Nitrogen atmosphere. The thickness of the cured film was about 75 microns.

The cured films were held at 50% relative humidity, at about 23° C., for seven days prior to testing.

Test specimens, approximately 25.4 mm in width and 127 mm long, were cut parallel to the direction in which the drawdown of the cured film was prepared. A thin layer of talc was applied to the first and third strips on each drawdown to reduce blocking during the adhesion test.

The instrument was calibrated prior to testing. The crosshead speed was set to 254 mm/min. For each material, the force required to remove four test specimens from the glass plate was measured and recorded on a strip chart recorder. The value reported is the average of the four measured values. The test specimens remaining on the glass plate were then held at 95% relative humidity, at about 23° C., in an environmental chamber for 1 more day. Prior to removing the plates from the environmental chamber, a layer of slurry (fine powdered polyethylene and water) was applied to the surface of the drawdown to retain the moisture. For each material, the force to remove four test specimens from the glass plate was measured as above.

F. RT FTIR Measurements

A 10 micron thick layer of the reactive composition on a gold coated Alumina plate was cured in a RT-FTIR instrument under a nitrogen atmosphere (Bruker IFS 55 equipped with a transflection cell and a UV source, an Oriel system with a 200 W Hg lamp, for a full description of the equipment see: A. A. Dias, H. Hartwig, J. F. G. A. Jansen conference proceedings PRA Radcure coating and inks; curing and performance June 1998 paper 15). The consumption of acrylate bonds was measured at 21° C. during the curing by this technique and the maximum rates of acrylate conversions (in mol/l sec) were calculated according to the above cited reference.

EXAMPLES AND COMPARATIVE EXPERIMENTS

Comparative Experiment A

A coating was prepared using 50 wt % of a polyether urethane acrylate (theoretical molecular weight≈9000), about 20 wt % of 8 times ethoxylated nonylphenol acrylate, 20 wt % laurylacrylate, 6 wt % of N-vinylcaprolactam, 1.5 wt % Lucirine TPO, 0.8 wt % Irganox 1035, 0.1 wt % diethanolamine and 0.3% Seesorb 102.

Results of tests are as follows: equilibrium modulus 0.4 MPa, E'23 is 0.5 MPa, very little strain hardening, Go=26 J/m$^2$. Curing was achieved with 1 J/cm$^2$ irradiation. In the relative Mooney plot of FIG. 4, this coating is represented by the curve for Comp. Exp. A. The cavitation strength at the 10$^{th}$ cavitation $\sigma_{10}$ was measured to be 0.96 MPa (see FIG. 3).

Comparative Experiment B and Example 1

A commercial coating with an equilibrium modulus of 1.0 MPa was used. In comparative experiment B, the sample was cured using a dose of 1 J/cm$^2$. The cavitation strength measured at the occurrence of the cavitation was 1.21 MPa. The storage modulus E' at 23° C. of the coating E'23 is 0.97 MPa. Hence, the value of $\sigma_{10}$/E'23 was 1.25, Go=22 J/m$^2$.

In Example 1, the sample was first cured with three short flashes of UV-light (in total about 1 cJ/cm$^2$ or less), whereafter the sample was cured at 1 J/cm$^2$ (as described in the Description of Test Methods above). A laboratory Macam lamp which is a 400 W metal halide lamp (Macam, Flexicure system) is used to pre-cure the sample (the three short flashes of 1 cJ/cm$^2$ or less in total): UV-light is fed into the cell by a liquid filled light guide, resulting in a cut-off of the wavelengths below 260 nm.

The cavitation strength of the coating of Example 1 measured at the tenth cavity $\sigma_{10}$ was 1.47 MPa and E'23 was 0.97 MPa (see FIG. 3), hence, the $\sigma_{10}$/E'$_{23}$ was 1.52.

FIG. 3 shows the number of cavitations observed at increasing stresses on the primary coating sample without (Comp. Experiment B) and with (Ex. 1) precure.

Example 2

A coating was formulated using 69.7 wt % of a polyether urethane acrylate oligomer having a polyether backbone comprising on average two blocks polypropylene glycol having an average Mw of about 4000 and being end-capped with ethoxy groups (the oligomer is the reaction product of a polyether polyol, toluene diisocyanate and 2-hydroxyethyl acrylate), 20.4 wt % 2-phenoxyethyl acrylate, 6.4 wt % tripropyleneglycoldiacrylate, 2.0 wt. % Lucerin TPO, 0.3 wt % DC190, 0.2 wt % DC57 and 1 wt % mercapto silane.

The equilibrium modulus was 0.6 MPa. The modulus E' at 23° C. was 0.7 MPa. The relative Mooney plot is given in FIG. 4. The cavitation strength at the tenth cavity $\sigma_{10}$ was measured to be 1.24 MPa after 1 J/cm$^2$ cure (see FIG. 3); the $\sigma_{10}$/E'$_{23}$ was 1.77; Go=31 J/m$^2$.

Example 3

A primary coating composition was formulated using 38.8 wt % of an aliphatic polyether-polycarbonate based urethane acrylate oligomer having an average Mw of 4000 (the oligomer is derived from 2-hydroxyethylacrylate, isophoronediisocyanate, and equal amounts of polypropyleneglycol diol and a copolymer diol of 10-15 wt % polyether/85-90 wt % polycarbonate), 48.5 wt % of N butylurethane O ethyl acrylate (CL1039), 9.7 wt. % isodecyl acrylate and 3 wt % of Irgacure 184 photoinitiator.

The equilibrium modulus is 1.31 MPa. The calculated volumetric thermal expansion coefficient $\alpha_{23}$ is $6.74 \times 10^{-4}$ K$^{-1}$.

Comparative Experiment C

A coating was prepared using 60 wt % of a polyether urethane acrylate (theoretical molecular weight≈4000), 18.6 wt % of 4 times ethoxylated nonylphenol acrylate, 4 wt % 1-(2-hydroxypropylphenoxy acrylate, 7 wt % laurylacrylate, 7.8 wt % of N-vinylcaprolactam, 1.2 wt % Lucirine TPO, 0.3 wt % Irganox 1035, and 0.1 wt % diethanolamine.

Results of tests are as follows: equilibrium modulus 1.2 MPa. The calculated volumetric thermal expansion coefficient $\alpha_{23}$ is $7.15 \times 10^{-4}$ K$^{-1}$.

The comparison between the primary coatings of Example 3 and Comparative Experiment C shows that the actual stress level in the coating of Example 3 (with an $\alpha_{23}$ within the claimed range) is lowered compared to the stress level in the primary coating of Comparative Experiment C. The gain on the lowering of the stress in the primary coating is depending on de thermal volumetric expansion coefficient of the secondary coating. Typically, for a secondary coating having an $\alpha_{23}$ of $3.0 \times 10^{-4}$ K$^{-1}$, the stress in the primary of Example 3 is about 20% lower than the stress in the primary coating of Comparative Experiment C. For a secondary having an $\alpha_{23}$ of $3.5 \times 10^{-4}$ K$^{-1}$, the stress in the primary of Example 3 is about 50% lower than the stress in the primary coating of Comparative Experiment C. Thus, the resistance to cavitation is increased going from primary coating of Comparative Experiment C to primary coating of Example 3. Furthermore, this comparison shows that the stress in the primary coating further lowers upon increasing $\alpha_{23}$ of the secondary coating which is used together with the primary coating from $3.0 \times 10^{-4}\,K^{-1}$ to $3.5 \times 10^{-4}\,K^{-1}$.

Example 4

A secondary coating composition was formulated using 50 wt. % of an aliphatic polyether based urethane acrylate oligomer (the oligomer is derived from 2-hydroxyethylacrylate, isophorone diisocyanate, and polytetrahydrofuran having Mn of 1000), 32.8 wt. % of 2-hydroxyethylacrylate, 17.2 wt. % of HEA-IPDI-5CC adduct (as described for coating U in Table 1 above) and 1 wt. % of Irgacure 184.

The calculated $\alpha_{23}$ is $6.42 \times 10^{-4}\,K^{-1}$, the rate of polymerization is 2.99 mol/l sec.

Example 5

A secondary coating composition was formulated using 50 wt. % of an aliphatic polyether based urethane acrylate oligomer (the oligomer is derived from 2-hydroxyethylacrylate, isophorone diisocyanate, and polytetrahydrofuran having Mn of 1000), 32.8 wt. % of 2-hydroxyethylacrylate, 17.2 wt. % of ethoxylated (n=4) nonyl phenol acrylate and 1 wt. % of Irgacure 184.

The calculated $\alpha_{23}$ is $6.71 \times 10^{-4}\,K^{-1}$. The rate of polymerization is 2.67 mol/l sec.

The invention claimed is:

1. An assembly for measuring the cavitation strength of a coating comprising:
    a first member having a surface;
    a second member having a second surface opposing said first surface;
    at least one of said first member and said second member being transparent to ultraviolet light; said first surface being moveable in a direction normal towards said second surface; said first surface defining with said second surface a cavity for receiving a sample; and a sub-assembly in contact with said first member or said second member; said sub-assembly comprising at least one element capable of adjusting the position of said first surface or said second surface in such a manner that said first surface or said second surface is perpendicular to the direction of said normal movement.

2. An assembly according to claim 1, wherein both said first surface and said second surface are perpendicular to the direction of said normal movement.

3. A tensile testing apparatus comprising the assembly according to claim 1.

4. Method for measuring the cavitation strength of a radiation cured coating comprising the steps of:
    making a sample by treating two plates by applying a liquid coating in between the two plates in a thickness of between 10 and 300 μm and over a certain area and by curing said coating with a UV-dose, the treatment of the two plates being such that the adhesion between the plates and the cured coating is sufficient to obtain cavitation before debonding sets in,
    placing the sample in a tensile testing apparatus, which is provided with a microscope, in such a way that a substantially parallel alignment and an acceptable compliance of the total tensile testing apparatus is obtained, running a deformation test on said sample while measuring the force at which a defined number of cavities starts to be visible through the microscope at a certain magnification, and calculating the stress by diving said force by the area of the coating applied and reporting said stress in relation to said cavities.

* * * * *